(12) United States Patent
Kajita et al.

(10) Patent No.: US 11,837,915 B2
(45) Date of Patent: Dec. 5, 2023

(54) R-T-B-BASED MAGNET, MOTOR, AND GENERATOR

(71) Applicant: TDK CORPORATION, Tokyo (JP)

(72) Inventors: Tomohiro Kajita, Tokyo (JP); Shota Miyazaki, Tokyo (JP); Keiji Takeda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 595 days.

(21) Appl. No.: 17/059,390

(22) PCT Filed: May 17, 2019

(86) PCT No.: PCT/JP2019/019763
§ 371 (c)(1),
(2) Date: Nov. 27, 2020

(87) PCT Pub. No.: WO2019/230457
PCT Pub. Date: Dec. 5, 2019

(65) Prior Publication Data
US 2021/0242727 A1     Aug. 5, 2021

(30) Foreign Application Priority Data

May 29, 2018  (JP) .................................. 2018-102773

(51) Int. Cl.
| | | |
|---|---|---|
| *H02K 1/02* | (2006.01) | |
| *H01F 1/057* | (2006.01) | |
| *H01F 7/02* | (2006.01) | |

(52) U.S. Cl.
CPC ............ *H02K 1/02* (2013.01); *H01F 1/0577* (2013.01); *H01F 7/0205* (2013.01)

(58) Field of Classification Search
None
See application file for complete search history.

(56) References Cited

U.S. PATENT DOCUMENTS

| | | |
|---|---|---|
| 2009/0032147 A1 | 2/2009 | Nozawa et al. |
| 2013/0271249 A1 | 10/2013 | Suzuki et al. |

(Continued)

FOREIGN PATENT DOCUMENTS

| | | |
|---|---|---|
| JP | 2009-302262 A | 12/2009 |
| JP | 2010-034522 A | 2/2010 |

(Continued)

OTHER PUBLICATIONS

Dec. 1, 2020 International Preliminary Report issued in International Patent Application No. PCT/JP2019/019763.

(Continued)

*Primary Examiner* — Anthony M Liang
(74) *Attorney, Agent, or Firm* — Oliff PLC

(57) ABSTRACT

The R-T-B-based magnet contains one or more kinds of rare earth elements (R), a transition metal element (T) including iron or iron and Co as an essential element, B, an element M that is Ga or Ga and Al, and C. When ratios of the number of atoms of R, T, B, M, and C are set as a, b, c, d, and e, respectively, relationships of $14\% \leq a \leq 20\%$, $70\% \leq b \leq 82\%$, $4\% \leq c \leq 7\%$, $0.009 \leq d/b \leq 0.035$, and $0.025 \leq e/b \leq 0.055$ are satisfied. The R-T-B-based magnet includes main phase crystal grains having an $R_2T_{14}B$-type tetragonal structure, and a grain boundary phase including an R-T-M-C phase. When ratios of R, T, M, and C in the main phase crystal grains are set as $R_{MP}$, $T_{MP}$, $M_{MP}$, and $C_{MP}$, and ratios of R, T, M, and C in the R-T-M-C phase are set as $R_{RC}$, $T_{RC}$, $M_{RC}$, and $C_{RC}$, relationships of $R_{RC} > R_{MP}$, $T_{RC} < T_{MP}$, $M_{RC} > M_{MP}$, and $C_{RC} > C_{MP}$ are satisfied, and a relationship of $0.07 \leq M_{RC}/T_{RC} \leq 0.65$ is satisfied.

9 Claims, 9 Drawing Sheets

(56) References Cited

U.S. PATENT DOCUMENTS

2017/0250013 A1    8/2017   Ishiyama et al.
2018/0040400 A1    2/2018   Takeda et al.

FOREIGN PATENT DOCUMENTS

| JP | 2010-045068 A | 2/2010 |
| JP | 2010-074084 A | 4/2010 |
| JP | 2012-099852 A | 5/2012 |
| JP | 2017-157834 A | 9/2017 |
| JP | 2018-019080 A | 2/2018 |
| WO | 2012/090765 A1 | 7/2012 |

OTHER PUBLICATIONS

Aug. 6, 2019 International Search Report issued in International Patent Application No. PCT/JP2019/019763.

R-T-B-BASED MAGNET, MOTOR, AND GENERATOR

TECHNICAL FIELD

The present invention relates to an R-T-B-based magnet, a motor, and a generator. Particularly, the invention relates to an R-T-B-based magnet suitable for a variable magnetic flux magnet that constitutes a variable magnetic force motor and a generator.

BACKGROUND ART

A high-efficiency permanent magnet synchronous motor that can save energy through inverter control has been used as power units for consumers, industries, and transportation apparatuses. However, in the permanent magnet synchronous motor in which a magnetic flux of a permanent magnet is constant, an induced voltage becomes higher in proportion to a rotation speed, and thus driving at a wide range of rotation speeds becomes difficult. Therefore, a method called a field weakening control is applied to the permanent magnet synchronous motor in a medium and high-speed range and a light load. In the field weakening control, a magnetic flux of a permanent magnet is canceled by a demagnetization field due to an armature current and an interlinkage magnetic flux is reduced so that the induced voltage does not exceed a power supply voltage. However, in order to keep continuously applying the demagnetization field, the armature current that does not contribute to a motor output needs to be kept continuously flowing, and as a result, there is a problem that motor efficiency deteriorates.

To solve the problem, for example, Patent Document 1 discloses a variable magnetic force motor in combination of a low-coercivity Sm—Co-based permanent magnet (variable magnetic flux magnet) in which a magnetization reversibly varies by applying an external magnetic field, and a fixed magnetic flux magnet that causes a magnetic field to act on the variable magnetic flux magnet. In the variable magnetic force motor, the induced voltage is reduced by lowering the magnetization of the variable magnetic flux magnet in the medium and high-speed range and the light load, and thus efficiency deterioration of the motor due to the conventional field weakening control can be suppressed.

However, in the Sm—Co-based permanent magnet described in Patent Document 1, there is a problem that Co as a main raw material is expensive. In addition, saturation magnetization of the Sm—Co-based permanent magnet that is the variable magnetic flux magnet is approximately 12.5 kG to the maximum, and does not reach saturation magnetization of a neodymium magnet that is the fixed magnetic flux magnet. According to this, a magnetic force difference occurs between the fixed magnetic flux magnet and the variable magnetic flux magnet, and thus there is a problem that the output and efficiency of the variable magnetic force motor deteriorate.

Here, it is considered the R-T-B-based magnet is applied as a magnet for the variable magnetic flux magnet.

Patent Document 2 discloses an R-T-B-based magnetic material in which a remanence Br is 11 kG or more, coercivity HcJ is 5 kOe or less, and an external magnetic field necessary for setting the remanence Br to 0 is 1.10 HcJ or less. It is disclosed that the R-T-B-based magnetic material includes a crystal grain containing a rare earth element R, a transition metal element T, and boron B, and a content ratio of Cu in the crystal grain is 0.5 to 0.6 atomic % with respect to total elements in the crystal grain.

Patent Document 3 discloses a permanent magnet of which a composition is $(Ce_{1-x-y}R1_xR2_y)_aFe_bCo_cB_d$-$M_eX_fC_gA_h$. R1 is at least one kind selected from Nd, Pr, Sm, and La, and R2 is at least one kind selected from Tb, Dy, and elements which are not selected as R1. In addition, M is an element such as Ti, X is an element such as Ga, and A is at least one kind selected from F and O. It is described that the permanent magnet can change a magnetization state, and has low coercivity.

Patent Document 4 discloses an R—Fe—B-based magnet. In the R—Fe—B-based magnet, an average crystal grain size is 0.01 to 2 μm, powder grains having a texture of $Nd_2T_{14}B$-type crystal phases are coupled, a rare earth element rich phase exists at a position between the powder grains, and a number density of the rare earth rich phase is $1.6 \times 10^4$ pieces/mm$^2$ or more. However, the R—Fe—B-based magnet is intended to obtain high coercivity, and does not have magnetic characteristics capable of being applied to the variable magnetic flux magnet.

CITATION LIST

Patent Document

Patent Document 1: JP 2010-34522 A
Patent Document 2: WO 2012/090765 A
Patent Document 3: JP 2010-74084 A
Patent Document 4: JP 2012-99852 A

SUMMARY OF THE INVENTION

Problem to be Solved by the Invention

The R-T-B-based magnetic material described in Patent Document 2 has a higher remanence in comparison to the Sm—Co-based magnet for the conventional variable magnetic force motor, and thus high output and high efficiency of the variable magnetic force motor are expected. However, in the R-T-B-based magnetic material described in Patent Document 2, only magnetic characteristics in a saturated magnetization state are described.

Here, the saturated magnetization state indicates a state in which a sample is magnetized by applying saturation magnetic field. In the R-T-B-based magnetic material described in Patent Document 2, a magnetizing field Hmag that is at least three or more times the coercivity is necessary to realize the remanence in the saturated magnetization state. According to this, in the R-T-B-based magnetic material described in Patent Document 2, the magnetizing field Hmag necessary for magnetization switching of the R-T-B-based magnetic material increases regardless of low coercivity. When the magnetizing field Hmag increases, there is a problem that it exceeds the upper limit of a magnetic field capable of being applied with a stator coil of a motor.

In addition, the present inventors have found that in order to widen a high-efficiency operation range of the variable magnetic force motor, it is preferable that a variation rate of an induced voltage of an operating point in a magnetization state and in a demagnetization state of a magnet is large, to this end, it is necessary for a magnetization variation with respect to a magnetic field variation to be small in a minor loop relating to the magnetization switching. Particularly, it is preferable that the magnetization variation from second and third quadrants to first and fourth quadrants of a hysteresis curve is small. This preferable state is expressed as "minor curve flatness is high" in this specification.

However, in the R-T-B-based magnetic material described in Patent Document 2, even in the saturated magnetization state, the magnetization variation with respect to the magnetic field variation is large. Accordingly, in the minor loop in the case of being magnetized in a magnetic field lower than the saturation magnetic field, there is a problem that the magnetization variation with respect to the magnetic field variation further increases.

In addition, Patent Document 3 discloses that the minor curve flatness at the second and third quadrants is relatively satisfactory when the magnetizing field is 10 kOe, but there is no evaluation on the minor curve flatness in the first and fourth quadrants. In a case where the minor curve flatness in the first and fourth quadrants is low, it is difficult to specify a reverse magnetic field for changing a magnetization, and to control the magnetization.

The invention has been made in consideration of such circumstances, and an object thereof is to provide an R-T-B-based magnet in which coercivity and a magnetizing field are low, a remanence is high even after magnetized in a low magnetizing field, and minor curve flatness is high, and a motor and a generator which include the R-T-B-based magnet.

Means for Solving Problem

To accomplish the object, according to an aspect of the invention, there is provided the following R-T-B-based magnet.

[1] An R-T-B-based magnet containing one or more of rare earth elements; one or more of transition metal elements, including iron, or two or more of transition metal elements, including iron and cobalt; boron; an element M that is gallium, or gallium and aluminum; and carbon, in which a content ratio of the rare earth elements is set as "a", a content ratio of the transition metal elements is set as "b", a content ratio of boron is set as "c", a content ratio of the element M is set as "d", and a content ratio of carbon is set as "e" when the sum of elements contained in the R-T-B-based magnet is set to 100 at %, a, b, c, d, and e satisfy the following relationship, 14 at %≤a≤20 at %, 70 at %≤b≤82 at %, 4 at %≤c≤7 at %, 0.010≤d/b≤0.035, and 0.025≤e/b≤0.055, the R-T-B-based magnet includes main phase crystal grains composed of a compound having an $R_2T_{14}B$-type tetragonal structure, and a grain boundary phase existing between the main phase crystal grains, the grain boundary phase includes an R-T-M-C phase containing one or more of the rare earth elements, one or more of the transition metal elements or two or more of the transition metal elements, the element M, and carbon, the R-T-M-C phase satisfies relationships of $R_{RC}>R_{MP}$, $T_{RC}<T_{MP}$, $M_{RC}>M_{MP}$, and $C_{RC}>C_{MP}$, and $R_{RC}$ and $M_{RC}$ satisfy a relationship of $0.07 \leq M_{RC}/R_{RC} \leq 0.65$ when content ratios of the rare earth elements, the transition metal elements, the element M, and carbon contained in the main phase crystal grains are respectively set as $R_{MP}$, $T_{MP}$, $M_{MP}$, and $C_{MP}$, and content ratios of the rare earth elements, the transition metal elements, the element M, and carbon contained in the R-T-M-C phase are respectively set as $R_{RC}$, $T_{RC}$, $M_{RC}$, and $C_{RC}$.

[2] The R-T-B-based magnet according to [1], an average crystal grain size D50 of the main phase crystal grains is 2.50 µm or less.

[3] The R-T-B-based magnet according to [1] or [2],
the grain boundary phase includes an R-O-C-N phase in which content ratios of the rare earth elements, oxygen, carbon, and nitrogen are higher than content ratios of the rare earth elements, oxygen, carbon, and nitrogen contained in the main phase crystal grains,
an area ratio of the R-O-C-N phase is 10% or more when an area of the grain boundary phase is set as 100%, and
a maximum area of a phase in which the content ratio of the rare earth elements is higher than the content ratio of the rare earth elements contained in the main phase crystal grains is 70 µm² or less in the grain boundary phase.

[4] The R-T-B-based magnet according to any one of [1] to [3],
a CV value of a concentration distribution of carbon is 0.85 or less.

[5] The R-T-B-based magnet according to any one of [1] to [4],
the rare earth elements include Nd, and one or more kinds selected from the group consisting of Y, Ce, and Sm.

[6] The R-T-B-based magnet according to any one of [1] to [5],
the rare earth elements are composed of R1, R2, and Sm,
R1 is one or more of rare earth elements and includes Nd and does not include Y, Ce, and Sm, R2 is one or more of elements selected from Y and Ce, and,
in an (x, y) plane, x and y are on straight lines constituting a pentagon having a point A (0.000, 0.050), a point B (0.000, 0.150), a point C (0.700, 0.100), a point D (0.700, 0.000), and a point E (0.300, 0.000) as a vertex, or in a region surrounded by the pentagon, when a total number of atoms of the rare earth elements contained in the R-T-B-based magnet is set as 1, a ratio of the number of atoms of R2 to the total number of atoms of the rare earth elements is set as "x", and a ratio of the number of atoms of Sm to the total number of atoms of the rare earth elements is set as "y".

[7] A motor including the R-T-B-based magnet according to any one of [1] to [6].

[8] A generator including the R-T-B-based magnet according to any one of [1] to [6].

Effect of the Invention

According to the invention, it is possible to provide an R-T-B-based magnet in which coercivity and a magnetizing field are low, a remanence is high and minor curve flatness is high even after magnetized in a low magnetizing field, and a motor and a generator which include the R-T-B-based magnet.

MODE(S) FOR CARRYING OUT THE INVENTION

Figure 1:
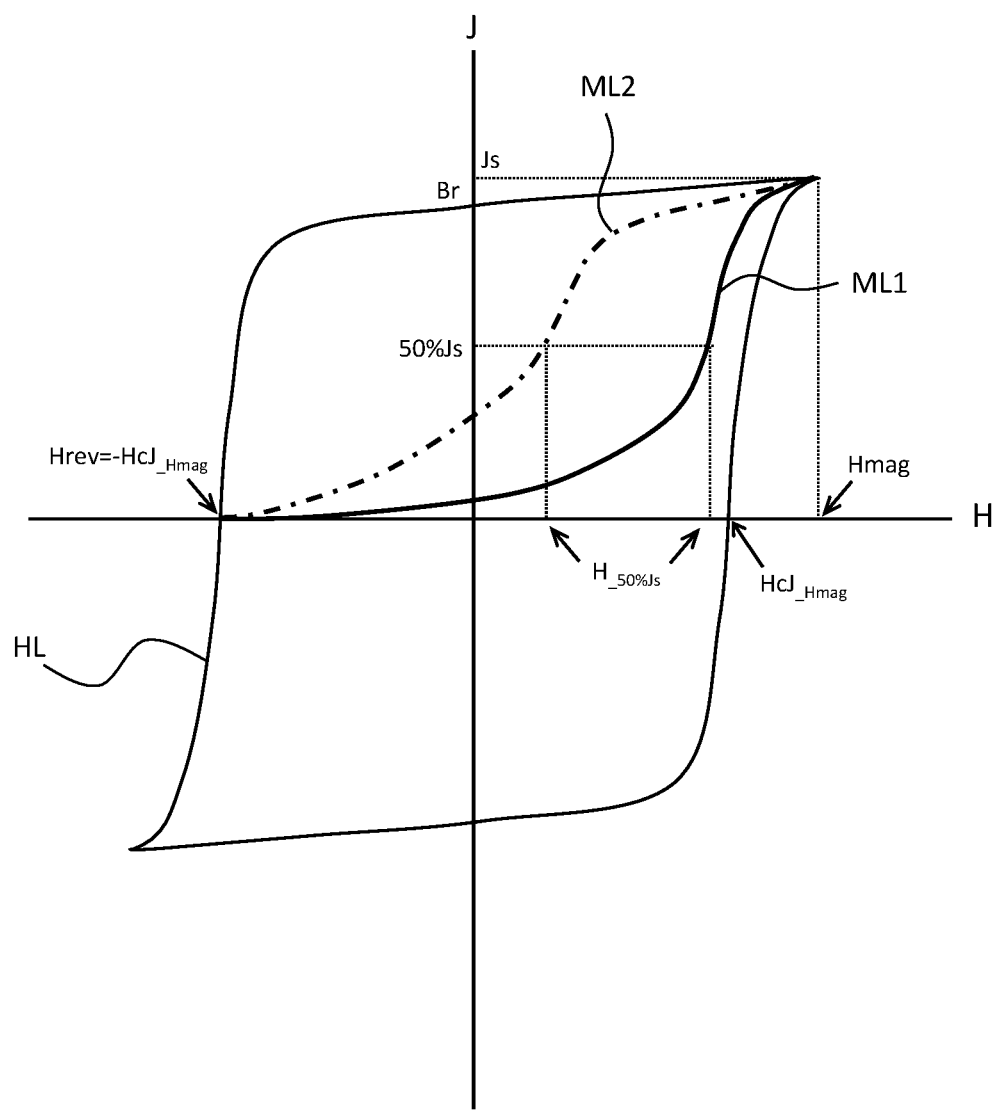
FIG. 1 is a schematic hysteresis loop for describing characteristics required for a variable magnetic flux magnet.

Hereinafter, the invention will be described in detail in the following order on the basis of a specific embodiment.
1. Characteristics Required for Variable Magnetic Flux Magnet
2. R-T-B-Based Magnet
    2.1 Main Phase Crystal Grain
        2.1.1 Composition of Main Phase Crystal Grain
        2.1.2 Crystal Grain Size of Main Phase Crystal Grain
    2.2 Grain Boundary Phase
        2.2.1 R-T-M-C Phase
        2.2.2 R-O-C-N Phase
        2.2.3 R-Rich Phase
        2.2.4 Identification of Phases Constituting Grain Boundary Phase
    2.3 Composition of R-T-B-Based Magnet
3. Method for Manufacturing R-T-B-Based Magnet
    3.1 Alloy Producing Process
        3.1.1 HDDR Treatment
    3.2 Pulverization Process
    3.3 Molding Process
    3.4 Sintering Process
4. Motor
5. Effect in This Embodiment

1. Characteristics Required for Variable Magnetic Flux Magnet

The R-T-B-based magnet according to this embodiment is a variable magnetic flux magnet. Characteristics required for the variable magnetic flux magnet are different from that of a typical R-T-B-based magnet in which coercivity is high. Here, first, characteristics required for the variable magnetic flux magnet will be described.

The variable magnetic flux magnet is a magnet capable of switching a magnetization state by repeating magnetization and demagnetization by an external field, and a high-magnetization state and a low-magnetization state are reversibly realized. In a variable magnetic force motor in which the variable magnetic flux magnet is incorporated, a magnetization state of the variable magnetic flux magnet is controlled by operating a magnetic field of an armature in correspondence with the rotation speed and a load state, so that a large magnetic flux is exhibited at an operating point in the magnetization state when a high torque is necessary (at the low-speed rotation or high load), and a small magnetic flux is exhibited at an operating point in the demagnetization state when the high torque is not necessary (at the high-speed rotation or low load). In the variable magnetic flux magnet, a difference in magnetization at the operating point between in the magnetization state and in the demagnetization state increases, and thus a variation rate in induced voltage of a motor between in the magnetization state and in the demagnetization state increases. As a result, a variation rate of torque of the variable magnetic force motor increases, and thus efficiency of the motor can be raised.

A magnetization state of the variable magnetic flux magnet can be switched in accordance with a predetermined minor loop. The minor loop is a magnetization variation behavior exhibited in a case where after applying a negative reverse magnetic field on a hysteresis loop HL shown in FIG. 1, and a magnetic field is increased again. The minor loop in this embodiment is a magnetization variation behavior in a case where after being magnetized by applying a positive magnetic field Hmag, a negative reverse magnetic field Hrev is applied, and then the magnetic field is swept again back to the magnetic field Hmag.

As characteristics required for the variable magnetic flux magnet, first, it is necessary to reduce the magnetizing field Hmag necessary for magnetization switching in consideration of energy saving and the upper limit of an applied external field. In this embodiment, the magnetizing field Hmag is defined as a minimum necessary magnetic field with which reproducibility for repetitive measurement is obtained. To reduce the magnetizing field Hmag, it is required for coercivity of the variable magnetic flux magnet to be small.

In addition, it is necessary to enlarge the variation amount of magnetization between in the magnetization state and in the demagnetization state of the variable magnetic flux magnet in order to widen a range in which the variable magnetic force motor can operate with high efficiency, and to this end, it is required for a remanence Br of the minor loop to be high after magnetized in the magnetizing field Hmag.

Furthermore, in the case of sweeping a magnetic field from the negative reverse magnetic field Hrev to the magnetic field Hmag on the minor loop, it is desirable that a magnetization does not vary up to a magnetic field as close to Hmag as possible, that is, from second and third quadrants to first and fourth quadrants of a hysteresis curve. The reason for this is because when the magnetization varies, there is a problem such as narrowing of a magnetization variable range, and difficulty in magnetization control occurs.

As described above, a variation state of the magnetization can be expressed by an index as minor curve flatness. In this embodiment, the minor curve flatness is defined as a ratio of a magnetic field $H_{-50\% \, Js}$ at which a magnetization of the minor loop from 0 is reversed by 50% with respect to a saturation magnetization Js, and coercivity $HcJ_{-Hmag}$. That is, the minor curve flatness is $100 \times (H_{-50\% \, Js}/HcJ_{-Hmag})$. As the minor curve flatness is higher, a magnetization variation from the negative reverse magnetic field Hrev to the magnetic field Hmag becomes smaller, which is preferable.

For example, in FIG. 1, when the magnetic field is swept from Hmag to the negative reverse magnetic field Hrev=−

$HcJ_{\_Hmag}$, and then back to Hmag again, the magnetization varies in accordance with ML1 or ML2. In a case where the magnetization varies in accordance with ML1, even when being swept from Hrev to Hmag, the magnetization variation is small, and $H_{-50\% \, Js}$ is very closer to $HcJ_{\_Hmag}$. Accordingly, in a case where the magnetization varies in accordance with ML1, the minor curve flatness is high.

On the other hand, in a case where the magnetization varies in accordance with ML2, when being swept from Hrev to Hmag, the magnetization varies immediately, and $H_{-50\% \, Js}$ is considerably smaller than $HcJ_{\_Hmag}$. Accordingly, in a case where the magnetization varies along ML2, the minor curve flatness is low.

By the way, the R-T-B-based magnet has a nucleation-type magnetization reversal mechanism. According to this, typically, the main phase crystal grain has a multi-domain structure, and a magnetic domain wall exists in a grain, and remains continuously up to a high magnetizing field Hmag. Accordingly, movement of the magnetic domain wall easily occurs in correspondence with an applied external field, and a magnetization greatly varies. In addition, since a nucleation magnetic field is different for every grain, due to this factor as well, the magnetization greatly varies in correspondence with an applied external field.

That is, the R-T-B-based magnet has a poor magnetizability at a low magnetizing field Hmag due to a magnetization reversal mechanism specific to the R-T-B-based magnet. Furthermore, in the case of sweeping a magnetic field from the negative reverse magnetic field Hrev to the magnetic field Hmag on the minor loop, a magnetization of the R-T-B-based magnet is more likely to vary due to the magnetization reversal mechanism specific to the R-T-B-based magnet in comparison to a pinning type magnet.

Therefore, in the R-T-B-based magnet, in a demagnetization process after being magnetized by the positive magnetic field Hmag, and in a magnetization process from the negative reverse magnetic field Hrev, in order to suppress the magnetization variation of the magnet, it is preferable that an $R_2T_{14}B$ main phase crystal grain that is responsible for magnetic characteristics of the R-T-B-based magnet has a single-domain structure, and the single-domain structure after being magnetized is stable even in a case where the magnetizing field Hmag is low.

2. R-T-B-Based Magnet

The R-T-B-based magnet according to this embodiment contains one or more kinds of rare earth elements (R), one or more kinds of transition metal elements (T), including iron or two or more kinds of transition metal elements (T), including iron and cobalt, boron (B), an element M, and carbon (C).

The rare earth element (R) includes scandium (Sc), yttrium (Y), and lanthanoid elements which belong to Group 3 of the long periodic table. The lanthanoid elements are lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). In addition, in this embodiment, the rare earth element preferably includes Nd and one or more kinds selected from Y, Ce, and Sm.

The element M is gallium (Ga), or gallium (Ga) and aluminum (Al). That is, the element M includes gallium.

Figure 2:
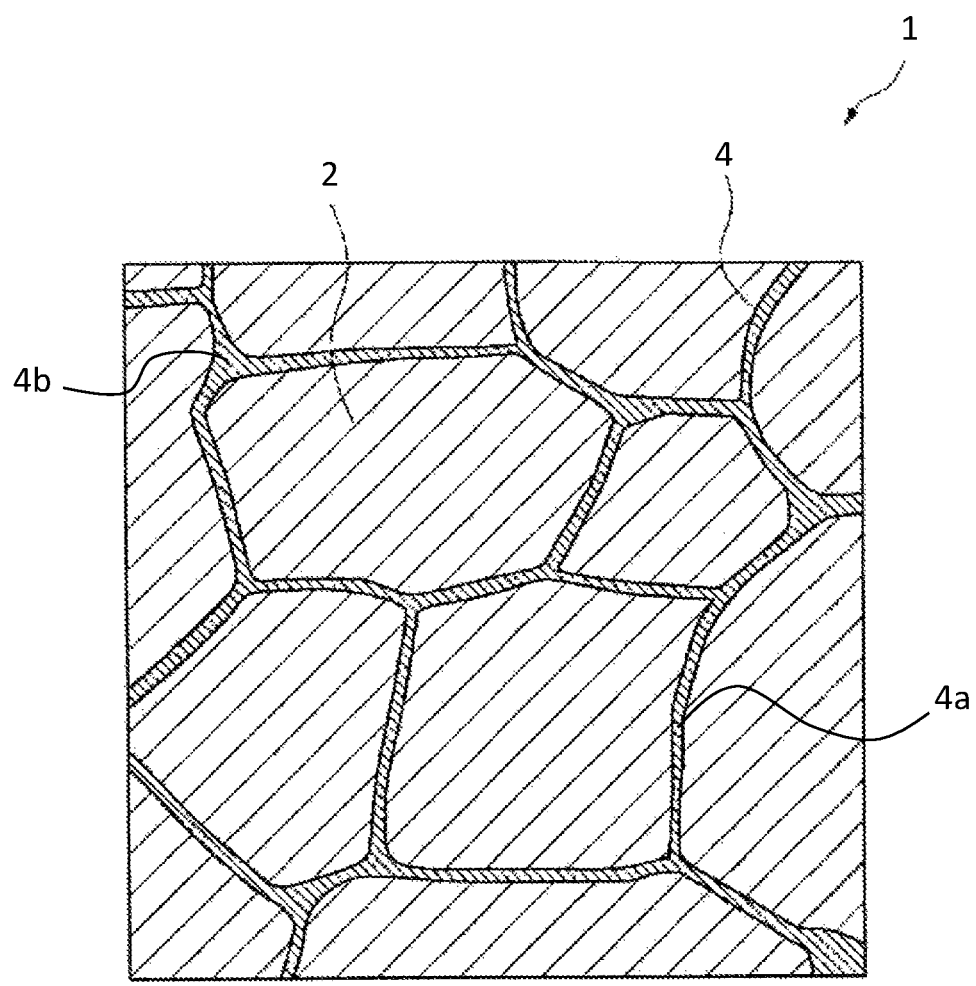
FIG. 2 is a schematic view illustrating a cross-section of an R-T-B-based magnet according to this embodiment.

In addition, as illustrated in FIG. 2, an R-T-B-based magnet 1 according to this embodiment includes a main phase crystal grain 2 composed of a compound having an $R_2T_{14}B$-type tetragonal structure, and a grain boundary phase 4 existing between the main phase crystal grains. Hereinafter, the compound having the $R_2T_{14}B$-type tetragonal structure is also referred to as $R_2T_{14}B$ compound. As the R-T-B-based magnet having the structure illustrated in FIG. 2, a sintered magnet obtained by sintering a green compact obtained by molding a raw material alloy powder is exemplified.

In this embodiment, the R-T-B-based magnet may include a protective film formed from a resin, a metal, or the like on a surface to prevent oxidation.

(2.1 Main Phase Crystal Grain)

In this embodiment, the main phase crystal grain composed of the $R_2T_{14}B$ compound exhibits ferromagnetism, and is responsible for magnetic characteristics of the R-T-B-based magnet.

(2.1.1 Composition of Main Phase Crystal Grain)

Most of the rare earth elements contained in the R-T-B-based magnet are contained in the main phase crystal grain. Accordingly, the kind of the rare earth elements constituting the $R_2T_{14}B$ compound typically match the kind of the rare earth elements contained in the R-T-B-based magnet, but matching may not be established. That is, a part of the rare earth elements contained in the R-T-B-based magnet may not be contained as the rare earth elements constituting the main phase crystal grain.

In this embodiment, T in the $R_2T_{14}B$ compound represents one or more kinds of transition metal elements including iron (Fe), or two or more kinds of transition metal elements including iron (Fe) and cobalt (Co). Co is an element that is contained in the $R_2T_{14}B$ compound in correspondence with characteristics necessary for the R-T-B-based magnet, and the amount thereof may be set in correspondence with the characteristics. In this embodiment, when the amount of T is set to 100 at %, the amount of Co is preferably 0 to 10 at %.

When the amount of Co is set within the above-described range, a Curie temperature in the R-T-B-based magnet can be raised, and thus it is possible to suppress coercivity with respect to temperature rising from being decreased. Furthermore, it is possible to improve corrosion resistance of the R-T-B-based magnet.

In the $R_2T_{14}B$ compound of this embodiment, B represents boron. A part of boron (B) may be substituted with carbon (C) in correspondence with characteristics necessary for the R-T-B-based magnet, but it is preferable that the amount of C existing within the main phase crystal grain is small. Specifically, a content ratio (concentration) of T contained in the main phase crystal grain is set as $T_{MP}$ (at %), and a content ratio (concentration) of C is set as $C_{MP}$ (at %), it is preferable to establish a relationship of $C_{MP}/T_{MP}$ 0.01.

In order to measure $C_{MP}/T_{MP}$, it is necessary to measure the concentration of C in the main phase crystal grain with accuracy. Examples of the method include a method of using a 3-dimensional atom probe (3DAP).

(2.1.2 Crystal Grain Size of Main Phase Crystal Grain)

In this embodiment, the crystal grain size of the main phase crystal grain is set to be small so that the main phase crystal grain stably has the single-domain structure. The reason for this is because the crystal grain size of the main phase crystal grain has a great influence on characteristics required for the variable magnetic flux magnet, particularly, the minor curve flatness. In this embodiment, D50 in a crystal grain size distribution of the main phase crystal grain is preferably 2.50 µm or less. Hereinafter, D50 is referred to as an average crystal grain size of the main phase crystal grain. D50 is more preferably 2.00 µm or less, and still more preferably 1.00 µm or less. In addition, D50 is preferably 0.25 µm or more, and more preferably 0.30 µm or more. D50 is an index of the crystal grain size of the main phase crystal grain, and in a case where D50 is within the above-described range, it can be determined that the crystal grain size of the main phase crystal grain is small.

Note that, in the case of performing an HDDR treatment to be described later, D50 is controlled by the HDDR treatment, an R-T-M-C phase, sintering conditions, and the like to be described later. On the other hand, in the case of not performing the HDDR treatment, D50 is controlled by fine pulverization conditions to be described later, the R-T-M-C phase, the sintering conditions, and the like.

In a case where D50 is excessively large, the crystal grain size of the main phase crystal grain increases, and thus there is a tendency that the single-domain structure of the main phase crystal grain becomes unstable, and the minor curve flatness decreases.

In a case where D50 is small and grain growth is insufficient, this case represents that sintering is not sufficient, and there is a tendency that voids generate in a sintered magnet. When the voids generate, Br tends to decrease, which is not preferable. In addition, when D50 decreases, $HcJ_{-Hmag}$ also tend to increase, which is not preferable. Accordingly, in this embodiment, the lower limit value of D50 is preferably 0.25 µm.

Note that, in this embodiment, for example, D50 may be measured as follows.

On a polished cross-section of a magnet (sintered magnet) after sintering, a region having a predetermined area is observed by using a scanning electron microscope (SEM) to obtain a backscattered electron image of the region. The polished cross-section may be parallel to an orientation axis, may be orthogonal to the orientation axis, or may have an arbitrary angle with respect to the orientation axis. The obtained backscattered electron image is analyzed with known software to identify the main phase crystal grain. Contours of a predetermined number of main phase crystal grains are extracted to calculate an area of the main phase crystal grains, and a diameter of a circle (equivalent circle diameter) having an area in which an accumulative distribution of the area of the main phase crystal grains becomes 50% can be set as D50.

For example, a region to be observed is preferably a region of 10 to 40 µm square. In addition, for example, the number of the main phase crystal grains of which an area is calculated is preferably 150 to 300 pieces.

(2.2 Grain Boundary Phase)

As illustrated in FIG. 2, the grain boundary phase 4 exists between the main phase crystal grains 2. The grain boundary phase 4 mainly includes a two-grain grain boundary 4a formed between two main phase crystal grains, and a triple junction 4b formed between three or more main phase crystal grains. The grain boundary phase is constituted by various phases having a composition different from that of the main phase crystal grain. For example, the phases constituting the grain boundary phase can be identified by a method to be described later.

(2.2.1 R-T-M-C Phase)

In this embodiment, the grain boundary phase includes an R-T-M-C phase. The R-T-M-C phase contains at least a rare earth element, a transition metal element, an element M, and carbon. When content ratios (at %) of the rare earth element, the transition metal element, the element M, and carbon contained in the main phase crystal grain are respectively set as $R_{MP}$, $T_{MP}$, $M_{MP}$, and $C_{MP}$, and content ratios (at %) of the rare earth element, the transition metal element, the element M, and carbon contained in the R-T-M-C phase are respectively set as $R_{RC}$, $T_{RC}$, $M_{RC}$, and $C_{RC}$, the R-T-M-C phase is a region satisfying relationships of $R_{RC}>R_{MP}$, $T_{RC}<T_{MP}$, $M_{RC}>M_{MP}$, and $C_{RC}>C_{MP}$.

In other words, a region where the element M and carbon more than the element M and carbon contained in the main phase crystal grain exist is present in the grain boundary phase. The R-T-M-C phase is likely to be formed due to presence of a large amount of element M and carbon in the grain boundary phase.

In this embodiment, the element M is gallium (Ga) or, gallium (Ga) and aluminum (Al). That is, as the element M, at least gallium is contained in the R-T-M-C phase.

Note that, the kinds of the rare earth element contained in the R-T-M-C phase may be the same as or less than the kinds of the rare earth element contained in the R-T-B-based magnet.

When the R-T-M-C phase is formed in the grain boundary phase at the time of sintering, fine main phase crystal grains can uniformly grow. As a result, the average grain size D50 of the main phase crystal grain after sintering does not increase so much in comparison to that before sintering, and can be set within the above-described range. As a result, it is possible to obtain a dense sintered magnet with few voids. In other words, since the R-T-M-C phase is formed in the grain boundary phase, it is possible to control grain growth of the main phase crystal grain, and it is easy to set D50 of the main phase crystal grain within the above-described range.

In this embodiment, in the R-T-M-C phase, $M_{RC}/R_{RC}$ is 0.07 to 0.65. When $M_{RC}/R_{RC}$ is set within this range, a ratio occupied by the R-T-M-C phase in the R-T-B-based magnet becomes appropriate, and at a sintering temperature at which the dense sintered magnet is obtained, the main phase crystal grain is caused to appropriately grow, and thus D50 can be set within the above-described range. Accordingly, the minor curve flatness tends to be improved.

$M_{RC}/R_{RC}$ is preferably 0.10 or more. In addition, $M_{RC}/R_{RC}$ is preferably 0.56 or less.

In a case where $M_{RC}/R_{RC}$ is excessively large, a ratio occupied by the R-T-M-C phase in the R-T-B-based magnet excessively increase, and thus a ratio occupied by the main phase tends to decrease. As a result, the remanence Br tends to decrease.

In a case where $M_{RC}/R_{RC}$ is excessively small, there is a tendency that the R-T-M-C phase is less likely to be formed, it is difficult to control a crystal grain size of the main phase crystal grain, and abnormal grain growth occurs and a coarse main phase crystal grain is formed even at a low firing temperature at which a dense sintered magnet is not obtained. As a result, the minor curve flatness tends to decrease.

Furthermore, in the R-T-M-C phase, $C_{RC}/R_{RC}$ is preferably 0.10 to 0.87. When $C_{RC}/R_{RC}$ is set within this range, there is a tendency that a ratio occupied by the R-T-M-C phase in the R-T-B-based magnet becomes appropriate, and the main phase crystal grain is caused to appropriately grow at a sintering temperature at which a dense sintered magnet is obtained, and thus D50 can be set within the above-described range. In addition, the magnetism of the R-T-M-C phase tends to be non-ferromagnetic. As a result, the minor curve flatness tends to be improved.

$C_{RC}/R_{RC}$ is more preferably 0.31 or more. On the other hand, $C_{RC}/R_{RC}$ is more preferably 0.82 or less.

In a case where $C_{RC}/R_{RC}$ is excessively large, there is a tendency that a sintering temperature at which the dense sintered magnet is obtained becomes high. When the sintering temperature becomes excessively high, even though the R-T-M-C phase is formed, it is difficult to suppress abnormal grain growth. On the other hand, when sintering is performed at a low firing temperature at which abnormal grain growth does not occur, there is a tendency that a void generates in a sintered magnet. As a result, the remanence Br tends to decrease.

In a case where $C_{RC}/R_{RC}$ is excessively small, there is a tendency that the R-T-M-C phase is less likely to be formed, and thus it is difficult to control the crystal grain size of the main phase crystal grain, and abnormal grain growth occurs and a coarse main phase crystal grain is formed even at a temperature at which the dense sintered magnet is not obtained. As a result, the minor curve flatness tends to decrease.

Note that, boron (B) may be contained in the R-T-M-C phase, but it is preferable that a concentration thereof is low. Specifically, when a content ratio (at %) of boron contained in the R-T-M-C phase is set as $B_{RC}$, $B_{RC}/R_{RC}$ is preferably less than 0.30, and more preferably 0.24 or less.

Furthermore, oxygen (O) may be contained in the R-T-M-C phase, but it is preferable that a concentration thereof is low. Specifically, when a content ratio (at %) of oxygen contained in the R-T-M-C phase is set as $O_{RC}$, $O_{RC}/R_{RC}$ is preferably less than 0.20.

(2.2.2 R-O-C-N Phase)

In this embodiment, it is preferable that the grain boundary phase includes an R-O-C-N phase. The R-O-C-N phase is a region which contains at least a rare earth element, oxygen, carbon, and nitrogen, and in which content ratios (at %) of the rare earth element, oxygen, carbon, and nitrogen are higher than content ratios (at %) of the rare earth element, oxygen, carbon, and nitrogen contained in the main phase crystal grain.

The R-O-C-N phase is likely to be formed due to presence of a large amount of carbon in the grain boundary phase.

Note that, the kinds of the rare earth element contained in the R-O-C-N phase may be the same as or less than the kinds of the rare earth element contained in the R-T-B-based magnet.

In a case where the grain boundary phase includes the R-O-C-N phase, when an area of the entirety of the grain boundary phase is set as 100%, an area ratio of the R-O-C-N phase is preferably 10% or more. In the grain boundary phase, the R-O-C-N phase is likely to exist in a state of being dispersed instead of existing in a state of being aggregated. Accordingly, when the area ratio of the R-O-C-N phase satisfies the above-described range, the R-O-C-N phase is formed in a state of being appropriately dispersed, and thus among phases constituting the grain boundary phase, an R-rich phase that is likely to aggregate to the triple junction is divided by the R-O-C-N phase. As a result, it is possible to suppress a maximum area of the R-rich phase formed at the triple junction.

The area ratio of the R-O-C-N phase is more preferably 30% or more, and still more preferably 52% or more. On the other hand, the area ratio of the R-O-C-N phase is preferably 60% or less, and more preferably 57% or less.

(2.2.3 R-Rich Phase)

The R-rich phase is a phase in which a content ratio of the rare earth element contained in the R-rich phase is higher than a content ratio of the rare earth element contained in the main phase crystal grain. Examples of the R-rich phase include the above-described R-T-M-C phase and an R-T-B-C phase in which content ratios of the rare earth element, boron, and carbon are higher than content ratios of the rare earth element, boron, and carbon contained in the main phase crystal grain, and a content ratio of the transition metal element is lower than a content ratio of the transition metal element contained in the main phase crystal grain.

In this embodiment, a maximum area of the R-rich phase in the grain boundary phase is preferably 70 $\mu m^2$ or less, more preferably 60 $\mu m^2$ or less, and still more preferably 13.2 $\mu m^2$ or less.

The R-rich phase is likely to be aggregated and formed at the triple junction, and is diamagnetic or paramagnetic. Accordingly, when the R-rich phase is formed at the triple junction, a stray magnetic field from a magnetization of an adjacent main phase crystal grain converges and then penetrates through and wraps around the grain boundary phase, and a local demagnetization field is likely to generate in the R-rich phase. When the area of the R-rich phase formed at the triple junction is large, the generated demagnetization field becomes large, and particularly, at a high temperature, a nucleation field of reverse-magnetic-domain of the main phase crystal grain significantly decreases. As a result, an absolute value of a temperature coefficient β of coercivity becomes large.

In order words, when the area ratio of the R-O-C-N phase satisfies the above-described range, it is possible to reduce the area of the R-rich phase formed at the triple junction, and thus it is possible to suppress an absolute value of the temperature coefficient β of the coercivity.

Note that, since the content ratio of the rare earth element contained in the R-O-C-N phase is higher than that in the main phase crystal grain, the R-O-C-N phase is also included in the R-rich phase. However, as described above, the R-O-C-N phase is likely to be formed in a dispersed state, and thus a possibility that the R-rich phase exhibiting the maximum area is the R-O-C-N phase is very low.

Furthermore, the R-T-M-C phase and the R-T-B-C phase are phases containing carbon. Accordingly, at the grain boundary phase, suppression of the maximum area of these phases indicates that carbon does not exist locally, and is distributed in a relatively dispersed state in the R-T-B-based magnet.

In this embodiment, the carbon concentration distribution is expressed by variation coefficient (CV) value. The CV value of the carbon concentration distribution is preferably 0.85 or less, more preferably 0.67 or less, and still more preferably 0.50 or less. When the CV value satisfies the ranges, it is possible to suppress the absolute value of the temperature coefficient β of the coercivity.

(2.2.4 Identification of Phases Constituting Grain Boundary Phase)

In this embodiment, identification of phases constituting the grain boundary phase can be performed as follows. First, as in the case of measuring D50 of the main phase crystal grain, the main phase crystal grain and the grain boundary phase are identified from a backscattered electron image of a cross-section of the R-T-B-based magnet by using an SEM.

In the backscattered electron image, the grain boundary phase is constituted by a region in which contrast is different from the main phase crystal grain. In addition, the difference in contrast reflects a difference in composition between the main phase crystal grain and the grain boundary phase. Accordingly, it can be understood that the grain boundary phase is constituted by a phase having a different composition from the main phase crystal grain.

Next, with respect to the cross-section, a distribution of elements existing on the cross-section is measured by an electron probe micro analyzer (EPMA) using a wavelength-dispersive X-ray spectrometer to obtain element mapping data.

Next, a composition of each grain boundary phase included in the element mapping data of the cross-section is quantitatively measured on the basis of characteristic X-ray intensity of each element, and a phase matching the above-described composition conditions of the phase on the back-scattered electron image is specified. That is, from composition measurement results of the grain boundary phase, a region belonging to the R-T-M-C phase, the R-O-C-N phase, the R-T-B-C phase, or the like is specified.

In addition, $M_{RC}/R_{RC}$ and $C_{RC}/R_{RC}$ may be calculated from values of the characteristic X-ray intensity of respective element in the identified R-T-M-C phase, respectively.

After specifying respective phases on the backscattered electron image, with respect to an individual closed region belonging to the R-rich phase, the number of pixels is calculated. A phase in which the number of pixels is the greatest is the R-rich phase having the greatest area. Furthermore, an area of one pixel is calculated from a scale bar of the backscattered electron image or the like. The product of the number of pixels of the R-rich phase having the greatest area and the area of the one pixel can be set as the maximum area of the R-rich phase. In addition, an area ratio of the R-O-C-N phase to all grain boundary phases may be calculated as a ratio of the number of pixels belonging to the R-O-C-N phase when the number of pixels belonging to all the grain boundary phases is set as 100%.

Furthermore, with respect to the CV value of the carbon concentration distribution, an information relating to a detection amount of carbon for every measurement point (pixel) is obtained in the element mapping data by the EPMA. From the obtained information relating to the detection amount of carbon, a standard deviation of the detection amount of carbon and an average value of the detection amount of carbon at the measurement points are calculated, and the CV value may be calculated from the following expression.

CV value=standard deviation of detection amount of carbon/average value of detection amount of carbon (2.3 Composition of R-T-B-Based Magnet)

In the R-T-B-based magnet according to this embodiment, the content ratio a of the rare earth element (R) is 14 to 20 at %, the content ratio b of the transition metal element (T) is 70 to 82 at %, and the content ratio c of boron (B) is 4 to 7 at %.

In this embodiment, a ratio between M and T is within a predetermined range. Specifically, a relationship of $0.009 \leq d/b \leq 0.035$. When d/b is within the above-described range, there is a tendency that a ratio occupied by the R-T-M-C phase in the R-T-B-based magnet becomes appropriate, the main phase crystal grain is caused to appropriately grow at a sintering temperature at which a dense sintered magnet is obtained, and thus D50 is set within the above-described range. As a result, the minor curve flatness tends to be improved.

d/b is preferably 0.014 or more. On the other hand, d/b is preferably 0.030 or less.

In a case where d/b is excessively large, there is a tendency that a ratio occupied by the R-T-M-C phase in the R-T-B-based magnet becomes excessively large, and thus a ratio occupied by the main phase decreases. As a result, the remanence Br tends to decrease.

In a case where d/b is excessively small, there is a tendency that the R-T-M-C phase is less likely to be formed, and thus it is difficult to control the crystal grain size of the main phase crystal grain, and abnormal grain growth occurs and a coarse main phase crystal grain is formed even at a temperature at which a dense sintered magnet is not obtained. As a result, the minor curve flatness tends to decrease.

Furthermore, in this embodiment, a ratio between C and T is within a predetermined range. Specifically, a relationship of $0.025 \leq e/b \leq 0.055$ is established. When e/b is within the range, a ratio occupied by the R-T-M-C phase in the R-T-B-based magnet becomes appropriate, and there is a tendency that the main phase crystal grain is caused to appropriately grow at a sintering temperature at which a dense sintered magnet is obtained, and D50 can be set within the above-described range. As a result, the minor curve flatness tends to be improved.

e/b is preferably 0.033 or more. On the other hand, e/b is preferably 0.050 or less.

In a case where e/b is excessively large, there is a tendency that a sintering temperature at which a dense sintered magnet is obtained becomes high. When the sintering temperature is excessively high, even when the R-T-M-C phase is formed, it is difficult to suppress abnormal grain growth. On the other hand, when sintering is performed at a low firing temperature at which the abnormal grain growth does not occur, there is a tendency that a void generates in a sintered magnet. As a result, the remanence Br tends to decrease.

In a case where e/b is excessively small, there is a tendency that the R-T-M-C phase is less likely to be formed, and thus it is difficult to control the crystal grain size of the main phase crystal grain, and abnormal grain growth occurs and a coarse main phase crystal grain is formed even at a temperature at which the dense sintered magnet is not obtained. As a result, the minor curve flatness tends to decrease.

In addition, in this embodiment, from the viewpoint of obtaining a variable magnetic flux magnet having satisfactory characteristics, it is preferable that the rare earth element of the R-T-B-based magnet contains Nd, and at least one or more kinds selected from Y, Ce, and Sm as described above. Furthermore, it is preferable that the rare earth element is divided into three groups of R1, R2, and Sm. Specifically, R1 represents one or more kinds of rare earth elements which include Nd and do not include Y, Ce, and Sm, R2 represents one or more kinds of elements selected from Y and Ce.

An anisotropy field of an $R_2T_{14}B$ compound including Y and Ce as R is smaller than that of an $R_2T_{14}B$ compound including R1 such as Nd. Furthermore, since an $Sm_2T_{14}B$ compound has in-plane anisotropy, strong anisotropy field exhibited by the $R1_2T_{14}B$ compound can be dramatically reduced with a small amount of $Sm_2T_{14}B$ compound. Here, when Nd is substituted with one or more kinds selected from Y and Ce, and/or Sm, the coercivity of the R-T-B-based magnet can be reduced. Moreover, by controlling a substitution ratio of R1 with R2 and Sm, it is possible to further enhance magnetic characteristics suitable for the variable magnetic flux magnet in addition to reduction in the coercivity of the R-T-B-based magnet.

In a case where the rare earth elements contained in the R-T-B-based magnet is composed of R1, R2, and Sm, when the total number of atoms of the rare earth elements is set to 1, a ratio of the number of atoms of R2 to the total number of atoms of the rare earth elements is set as "x", and a ratio of the number of atoms of Sm to the total number of atoms of the rare earth elements is set as "y", R indicating the rare earth element can be expressed as $(R1_{1-x-y}R2_xSm_y)$.

Figure 3:
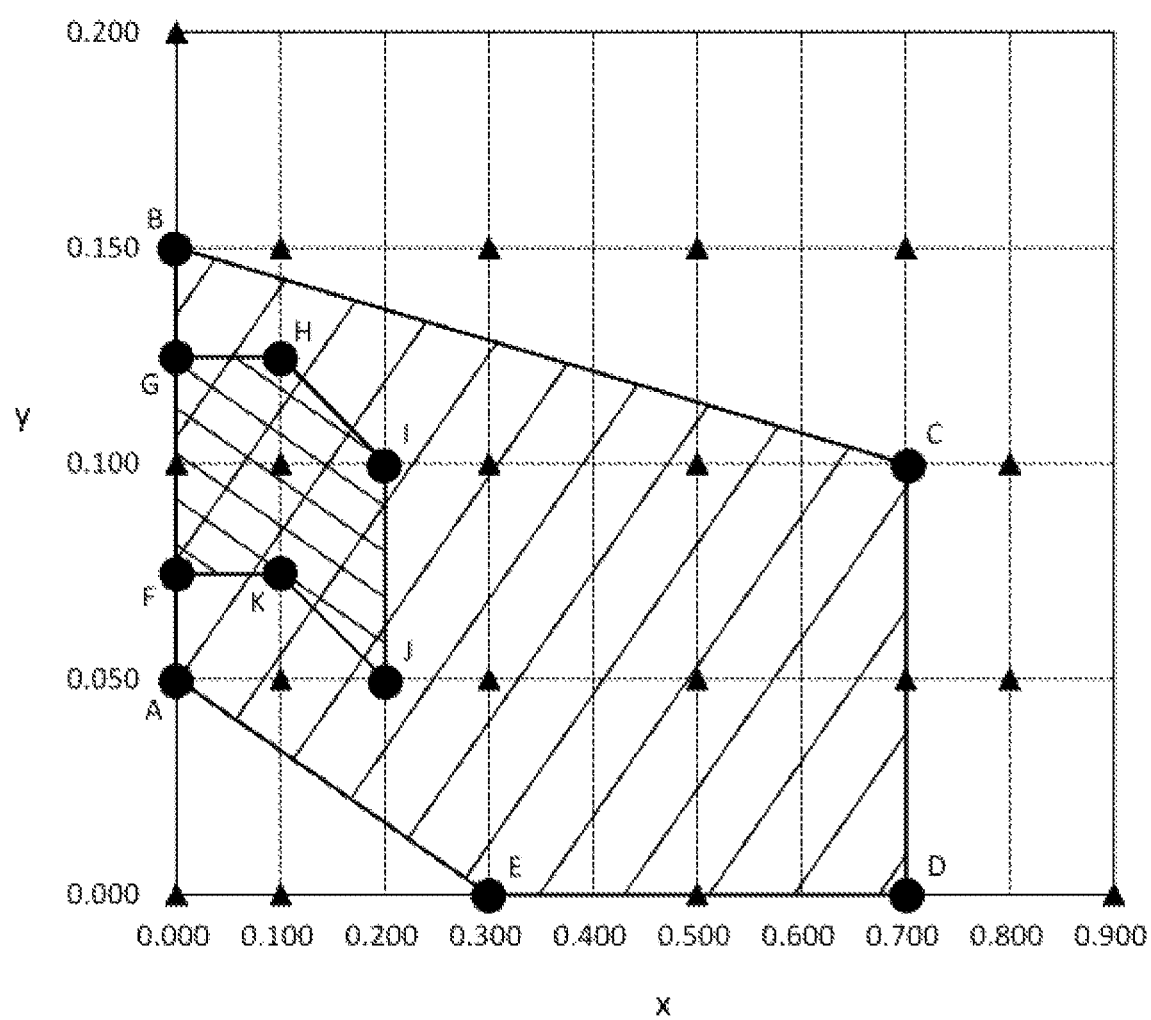
FIG. 3 is a graph showing a relationship between a ratio of the number of R2 atoms and a ratio of the number of Sm atoms in a case where rare earth elements contained in the R-T-B-based magnet according to this embodiment are composed of R1, R2, and Sm, and a ratio of a total number of atoms is set to 1.

It is preferable that x and y exist on straight lines constituting a pentagon having a point A (0.000, 0.050), a point B (0.000, 0.150), a point C (0.700, 0.100), a point D (0.700, 0.000), and a point E (0.300, 0.000) as a vertex, or in a region (a hatched portion in FIG. 3) surrounded by the pentagon as shown in FIG. 3. When x and y are within the range shown in FIG. 3, the coercivity of the magnet is further lowered, the magnetizing field is also lowered, and it is possible to obtain satisfactory minor curve flatness and a high remanence in the low magnetizing field.

Moreover, it is more preferable that x and y exist on straight lines connecting a point F (0.000, 0.075), a point G (0.000, 0.125), a point H (0.100, 0.125), a point I (0.200, 0.100), a point J (0.200, 0.050), and a point K (0.100, 0.075) shown in FIG. 3 in this order in the clockwise direction, or in a region (a cross-hatched portion in FIG. 3) surrounded by the straight lines. When x and y are within the above-described range shown in FIG. 3, the above-described effect can be enhanced.

Furthermore, it is still more preferable that x and y satisfy relationship of x=0, and $0.075 \leq y \leq 0.125$. That is, it is still more preferable that R1 is substituted with Sm in the above-described range. When x and y satisfy the relationships, the above-described effect can be further enhanced.

In this embodiment, from the viewpoint of obtaining a variable magnetic flux magnet having satisfactory characteristics, a ratio occupied by Fe, or Fe and Co in the transition metal element of the R-T-B-based magnet is preferably 0.90 or more.

The R-T-B-based magnet may contain an element A that promoting a reaction of the main phase crystal grain in a powder metallurgy process. The element A is one or more kinds selected from the group consisting of copper (Cu), zirconium (Zr), and niobium (Nb). A total amount of these elements contained is preferably in a range of 0.05 to 1.00 at % when a total amount of elements contained in the R-T-B-based magnet is set as 100 at %. Note that, the amount of Cu contained is preferably 0.20 at % or less.

When copper is added to the R-T-B-based magnet, a surface layer of the main phase crystal grain is subjected to reaction, and thus distortion, a defect, and the like can be removed. In addition, when zirconium and/or niobium are added to the R-T-B-based magnet, coarsening of the main phase crystal grain at the time of sintering is prevented, and the R-T-B-based magnet can be densified while maintaining a fine grain size.

Moreover, the R-T-B-based magnet may contain titanium (Ti), tantalum (Ta), vanadium (V), silver (Ag), germanium (Ge), or the like. In addition, the R-T-B-based magnet may contain unavoidable impurities such as impurities derived from raw material, and impurities mixed in at the time of manufacturing. In this embodiment, a total amount of the elements such as Ti, and the unavoidable impurities is preferably 1 at % or less in the R-T-B-based magnet.

Furthermore, the R-T-B-based magnet may contain oxygen (O) in a predetermined range. The amount of oxygen (O) contained is preferably 1000 to 8000 ppm. When the amount of O contained is excessively small, corrosion resistance of the magnet is insufficient, and the amount of O contained is excessively large, a liquid phase is not sufficiently formed in the magnet, and thus the coercivity decreases. In order to obtain the corrosion resistance and the coercivity in a more satisfactory manner, a range of 1500 to 3000 ppm is preferable.

In addition, the R-T-B-based magnet may contain nitrogen (N) in a predetermined range. The amount of N contained is preferably 8000 ppm or less. When the amount of N contained is excessively large, the coercivity tends to be insufficient.

The composition of the R-T-B-based magnet after sintering can be measured by, for example, inductively coupled plasma atomic emission spectroscopy (ICP-AES).

Moreover, as a measurement method of the amount of oxygen, the amount of carbon, and the amount of nitrogen contained in the R-T-B-based magnet after sintering, a method that is typically known conventional art can be used. The amount of oxygen is measured by, for example, an inert gas melting-non-dispersive infrared absorption method, the amount of carbon is measured by, for example, a combustion in oxygen stream-infrared absorption method, and the amount of nitrogen is measured by, for example, an inert gas melting-heat conductivity method.

3. Method for Manufacturing R-T-B-Based Magnet

Next, an example of a method for manufacturing the R-T-B-based magnet according to this embodiment will be described below.

(3.1 Alloy Producing Process)

First, raw material metals for manufacturing the R-T-B-based magnet according to this embodiment are prepared. The raw material metals are melted in vacuum or in an inert gas atmosphere to produce a raw material alloy having a predetermined composition.

Examples of the raw material metals include a rare earth metal or a rare earth alloy, pure iron, ferroboron, and alloys thereof. The composition of the raw material alloy may be adjusted according to a desired composition of the R-T-B-based magnet. In addition, the raw material metal of the element M may be added at the time of melting.

A method for obtaining the raw material alloy by melting the raw material metals is not particularly limited as long as the method is a known melting method, and examples thereof include a strip casting method, and a high-frequency induction melting. An atmosphere at the time of melting is preferably set to vacuum or an inert gas, and more preferably an argon (Ar) atmosphere.

In the strip casting method, a molten metal of the raw material alloy obtained by melting the raw material metals in a non-oxidizing atmosphere such as an Ar atmosphere is discharged to a surface of a rotating roll. The molten metal rapidly cooled on the roll is rapidly solidified into a thin plate or flake (scale) shape. The rapidly solidified alloy has a homogeneous structure having a crystal grain size of 1 to 50 µm. In addition, an alloy obtained by a reducing diffusion method can also be used as the raw material alloy.

In this embodiment, as a method for manufacturing a magnet by using the raw material alloy, a so-called single alloy method using one kind of raw material alloy is employed, but a so-called a mixing method using a main phase forming raw material alloy (low-R alloy) mainly including an $R_2T_{14}B$ compound that is a main phase crystal grain, and a grain boundary phase forming raw material alloy (high-R alloy) that contains R more than the low-R alloy, and effectively contributes to formation of a grain boundary phase may be adopted.

(3.1.1 HDDR Treatment)

In this embodiment, it is preferable to perform hydrogenation-disproportionation-desorption-recombination (HDDR) treatment on the raw material alloy. The HDDR treatment is a process of chemically obtaining a fine crystal grain by sequentially executing hydrogenation, disproportionation, desorption, and recombination of the raw material alloy. When the R-T-B-based magnet is manufactured by using the raw material alloy obtained by the HDDR treatment, the crystal grain size of the main phase crystal grain after sintering can be reduced, and a grain size distribution thereof can be narrowed.

In the HDDR treatment, the raw material alloy is kept at 700° C. to 900° C. in an $H_2$ gas atmosphere, or a mixed atmosphere of an $H_2$ gas and an inert gas for hydrogenating the raw material alloy, and then the raw material alloy is subjected to a dehydrogenation treatment at 700° C. to 900° C. until a partial pressure of the $H_2$ gas in the atmosphere reaches 13 Pa or lower, and then the raw material alloy is cooled down. According to this, an HDDR alloy having a fine structure is obtained.

(3.2 Pulverization Process)

The produced raw material alloy (the HDDR alloy or a raw material alloy that does not undergo the HDDR treatment) is subjected to a pulverization process. In the case of adopting the mixing method, a low-R alloy and a high-R alloy are pulverized individually or in combination. The pulverization process can be classified into a coarse crush process and a fine pulverization process. First, the raw material alloy is coarsely crushed until a particle size reaches several hundred μm.

As the coarse crush, hydrogen crush in which crush is performed by dehydrogenation after absorbing hydrogen into the raw material alloy is effective. The dehydrogenation treatment is performed in order to reduce hydrogen that becomes an impurity in a rare earth sintered magnet. A temperature at the time of absorbing hydrogen is room temperature. Heating holding temperature for dehydrogenation after absorbing hydrogen is set to 200° C. to 400° C. or higher, and preferably 300° C. The holding time varies depending on a relationship with a holding temperature, a composition and a weight of the raw material alloy, and the like, and is set to at least 30 minutes or longer per 1 kg, and preferably one hour or more. The dehydrogenation treatment is performed in vacuum or in an Ar gas flow.

In this embodiment, the coarse crush process is preferably the hydrogen crush, but mechanical coarse crush may be further performed on the raw material alloy by using a stamp mill, a jaw crusher, a brown mill, or the like.

After the coarse crush process, a fine pulverization process is performed. A jet mill is mainly used in the fine pulverization, and a powder having a particle size of approximately several hundred μm after the coarse crush is pulverized until an average particle size reaches 1.2 to 4 μm, preferably 1.5 to 3 μm. The jet mill generates a high-speed gas flow by releasing a high-pressure inert gas from a narrow nozzle, the coarsely pulverized powder is accelerated by the high-speed gas flow, collision with coarsely pulverized powders or collision with a target or a container wall is caused to occur for pulverization. A pulverized powder is classified by a classification rotor embedded in a pulverizer, and a downstream cyclone of the pulverizer.

In the fine pulverization, wet pulverization may be used. In the wet pulverization, a ball mill, a wet attritor, or the like can be used, and the coarsely pulverized powder having a particle size of approximately several hundred μm is pulverized until an average particle size reaches 1.5 to 4 μm, and preferably 2 to 3 μm. In the wet pulverization, since pulverization of an alloy proceeds without bringing the alloy powder into contact with oxygen by selecting an appropriate dispersion medium, a fine powder with a low oxygen concentration is obtained.

In this embodiment, as a carbon source of the R-T-M-C phase, and for the purpose of lubrication in a molding process to be described later, improvement in orientation of a magnet, or the like, a fatty acid or a derivative of the fatty acid, hydrogen carbide, or the like may be added to a powder in an amount of approximately 0.5 to 2.0 wt % at the time of the fine pulverization and/or after the fine pulverization.

Examples of the fatty acid or the derivative of the fatty acid include zinc stearate, calcium stearate, aluminum stearate, stearic acid amide, oleic acid amide, ethylene bisisostearic acid amide, and lauric acid amide, and examples of the hydrocarbon include paraffin and naphthalene.

(3.3 Molding Process)

Next, the powder after the fine pulverization is molded. In this embodiment, molding is performed while applying a magnetic field. A molding pressure in the magnetic field may be set to a range of 0.3 to 3 ton/cm² (30 to 300 MPa). The molding pressure may be constant from initiation to termination of the molding, or may be gradually increased or decreased, or may irregularly vary. As the molding pressure is low, orientation becomes further satisfactory. However, when the molding pressure is excessively low, the strength of a green compact is insufficient, and thus a problem occurs in handling. Accordingly, the molding pressure may be set in consideration of this situation. A final relative density of the green compact obtained from the molding in the magnetic field is typically 40% to 60%.

The magnetic field applied may be set to approximately 960 to 1600 kA/m. The magnetic field applied is not limited to a static magnetic field, and may be a pulsed magnetic field. In addition, the static magnetic field and the pulsed magnetic field may be used in combination.

(3.4 Sintering Process)

The green compact is subjected to a sintering process. Sintering is performed in vacuum or in an inert gas atmosphere. A holding temperature and holding time may be adjusted in consideration of a composition of a magnet, a method for pulverizing an alloy powder, an average crystal grain size and a grain size distribution of the main phase crystal grains, and the like. In this embodiment, the holding temperature is preferably 800° C. to 1000° C., and the holding time is preferably 1 minute to 20 hours. The holding time is more preferably 4 to 20 hours.

In this embodiment, the R-T-M-C phase is formed in a grain boundary phase at the time of sintering, and thus a fine $R_2T_{14}B$ crystal grain grows to a certain extent in which abnormal grain growth thereof is suppressed. As a result, the crystal grain size of the main phase crystal grain can be set within the range of D50.

After sintering, an aging treatment may be performed on the sintered magnet obtained. Aging treatment conditions may be appropriately set in consideration of a microstructure of the sintered magnet. For example, a treatment temperature may be set within a temperature range of 400° C. to 900° C.

4. Motor

Figure 4:
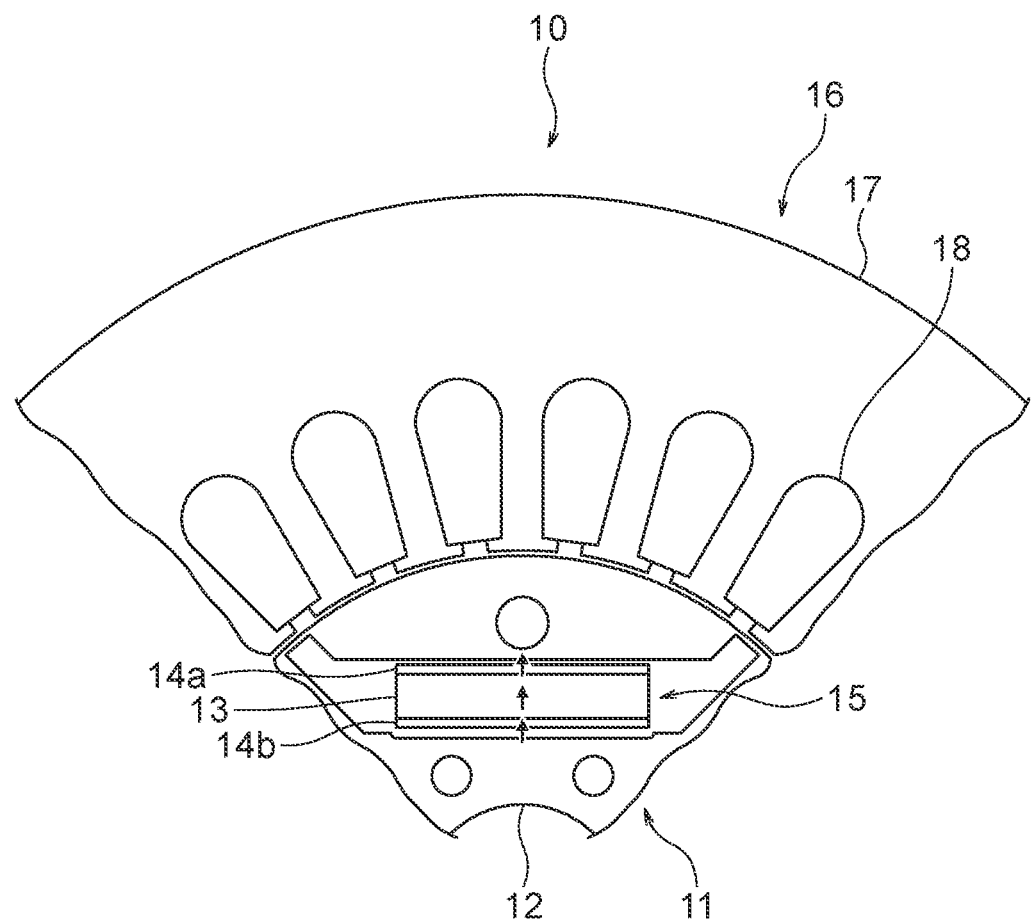
FIG. 4 is a schematic cross-sectional view of a motor in which the R-T-B-based magnet according to this embodiment is incorporated in a rotor.

A configuration of a motor according to this embodiment is not particularly limited as long as the motor includes the R-T-B-based magnet. However, in this embodiment, the R-T-B-based magnet is incorporated in a rotor of the motor. FIG. 4 illustrates an example of a motor 10 according to this embodiment.

FIG. 4 is a cross-sectional view of the motor 10 according to this embodiment when viewed from a rotational axis direction, and since the motor has 90-degree rotation symmetry, symmetrical portions are omitted. As illustrated in FIG. 4, the motor 10 includes a rotor 11 and a stator 16.

The rotor 11 includes a rotor iron core 12 and a stacked magnet 15. The rotor iron core 12 is constituted by stacking electromagnetic steel plates. The stacked magnet 15 includes a variable magnetic flux magnet 13 constituted by the R-T-B-based magnet according to this embodiment, and fixed magnetic flux magnets 14a and 14b constituted by a permanent magnet having coercivity and a magnetization which are greater than those of the variable magnetic flux magnet 13. In addition, the stacked magnet 15 is embedded in the rotor iron core 12.

As illustrated in FIG. 4, the fixed magnetic flux magnets 14a and 14b are arranged to overlap both main surfaces of the variable magnetic flux magnet 13 in a thickness direction of the stacked magnet 15, and are integrated therewith. In addition, as illustrated in FIG. 4, magnetization directions of the variable magnetic flux magnet 13 and the fixed magnetic flux magnets 14a and 14b are parallel to the thickness direction of the stacked magnet 15. That is, the variable magnetic flux magnet 13 and the fixed magnetic flux magnets 14a and 14b are magnetically arranged in series so that magnetization directions of the variable magnetic flux magnet 13 and the fixed magnetic flux magnets 14a and 14b are the same as each other. The magnetization direction (central axis direction) of the stacked magnet 15 becomes a d-axis, and a central axis direction between stacked magnets becomes a q-axis.

The stator 16 is disposed on an outer periphery side of the rotor 11 through an air gap. The stator 16 includes an armature iron core 17 and an armature winding 18. A magnetic field generates by feeding a momentarily large d-axis current to the armature winding 18, and the magnetization of the variable magnetic flux magnet 13 is reversibly changed to reversibly change a magnetic flux amount thereof.

In the variable magnetic flux magnet, a difference in magnetization between at an operating point in the magnetization state and at an operating point in the demagnetization state increases, and a variation rate in induced voltage of a motor between in the magnetization state and in the demagnetization state increases. As a result, a variation rate of torque of the variable magnetic force motor increases, and thus efficiency of the motor can be raised.

Particularly, as illustrated in FIG. 4, as a magnet that is embedded in the rotor iron core 12, when using the stacked magnet 15 in which the fixed magnetic flux magnets 14a and 14b and the variable magnetic flux magnet 13 are arranged to be stacked in series, the efficiency of the motor can be further raised.

In a case where the variable magnetic flux magnet 13 is embedded alone instead of the stacked magnet 15, an operating point of the motor in a typical operation is located at an irreversible demagnetization region beyond a bending point of a magnetization curve of the variable magnetic flux magnet 13 with small coercivity, and thus it is difficult to effectively use an inherent remanence Br of the variable magnetic flux magnet 13, and a magnetic flux in a maximum magnetization state, and a variation amount in magnetic flux between in a magnetization state and in a demagnetization state also decreases. As a result, efficiency of a motor which corresponds to the inherent performance of the variable magnetic flux magnet 13 is not obtained.

In contrast, when using the stacked magnet 15, the operating point of the variable magnetic flux magnet 13 in the typical operation is shifted in a positive magnetic field direction, and can be kept in a reversible region that does not exceed the bending point of the magnetization curve. In addition, the magnetic flux in the maximum magnetization state and the variation amount of the magnetic flux between in the magnetization state and in the demagnetization state can be increased.

Furthermore, in a case where a fixed magnetic flux magnet and a variable magnetic flux magnet are arranged to be stacked in series, as illustrated in FIG. 4, it is preferable that the fixed magnetic flux magnets 14a and 14b are arranged with both main surfaces of the variable magnetic flux magnet 13 interposed therebetween. Instead of the arrangement illustrated in FIG. 4, in the case of the variable magnetic flux magnet 13 alone, or in a case where the fixed magnetic flux magnet 14 is arranged to be stacked on a single surface of the variable magnetic flux magnet 13, a direction of lines of a magnetic flux passing through the inside of the variable magnetic flux magnet 13 caused by the d-axis current deviates from a magnetization direction as it becomes far from the air gap. As a result, a magnetic field that acts on the inside of the variable magnetic flux magnet 13 becomes non-uniform, and a magnetization state inside the variable magnetic flux magnet 13 also becomes non-uniform.

In contrast, in the case of the arrangement illustrated in FIG. 4, the direction of lines of the magnetic flux passing through the inside of the variable magnetic flux magnet 13 is rectified to the magnetization direction, and thus the magnetic field that acts on the inside of the variable magnetic flux magnet 13 becomes uniform, and the magnetization state inside the variable magnetic flux magnet 13 also becomes uniform. According to this, the magnetic flux in the maximum magnetization state, and the variation amount in magnetic flux between in the magnetization state and in the demagnetization state can be increased.

Note that, the R-T-B-based magnet according to this embodiment is also appropriately applied to a generator, but a configuration of the generator is the same as the configuration of the motor, and thus description thereof will be omitted.

5. Effect in this Embodiment

In this embodiment, in order to obtain the R-T-B-based magnet suitable as the variable magnetic flux magnet, the R-T-M-C phase in which the R concentration, the M concentration, and the C concentration are higher than those in the main phase crystal grain and the T concentration is lower than that in the main phase crystal grain is present between the main phase crystal grains composed of the $R_2T_{14}B$ compound. The R-T-M-C phase is formed at the grain boundary phase at the time of sintering, and thus grain growth of the main phase crystal grain can be controlled, and abnormal grain growth of the main phase crystal grain can be suppressed while allowing the main phase crystal grain to grow to a certain extent in which a dense sintered magnet is obtained.

As a result, the single-domain structure of the main phase crystal grain is stabilized, and a deviation in a nucleation magnetic field of the main phase crystal grain is suppressed. Accordingly, problems of the poor magnetizability in a low magnetic field and a steep slope of the minor loop which were difficult to solve due to the mechanism of the nucleation-type magnet are solved, and characteristics necessary for the variable magnetic flux magnet, particularly, the minor curve flatness can be made satisfactory while using the R-T-B-based magnet as the variable magnetic flux magnet.

In addition, when D50 of the main phase crystal grain is set within the above-described range, the single-domain structure of the main phase crystal grain can be further stabilized, and thus the minor curve flatness becomes further satisfactory.

Moreover, when the structure of the grain boundary phase is controlled as described above, it is possible to suppress a reduction rate of the coercivity at a high temperature while maintaining the minor curve flatness in a satisfactory manner.

Furthermore, as the rare earth element contained in the R-T-B-based magnet, when R1 is substituted with a rare earth element capable of lowering a high anisotropy field of the $R1_2T_{14}B$ compound represented by an $Nd_2T_{14}B$ compound, it is possible to realize low coercivity while maintaining characteristics necessary for the variable magnetic flux magnet. Particularly, when a substitution ratio of Y and/or Ce with respect to R1, and a substitution ratio of Sm with respect to R1 are controlled, it is possible to lower the magnetizing field while lowering coercivity, and it is possible to make satisfactory the remanence and the minor curve flatness at the low magnetizing field.

Hereinbefore, description has been given of the embodiment of the invention, the invention is not limited to the embodiment, and may be modified in various aspects within the scope of the invention.

EXAMPLES

Hereinafter, the invention will be described in more detail in examples. However, the invention is not limited to the following examples.

Experimental Example 1

First, raw materials were blended to obtain an R-T-B-based magnet having a composition shown in Table 1, the raw materials were melted, and the resultant molten metal was casted by a strip casting method to obtain a raw material alloy having a flake shape.

Next, the HDDR treatment was performed on raw material alloys of samples according to Experimental Examples 1-1 to 1-17. In the HDDR treatment, each of the raw material alloy was kept at 800° C. in an $H_2$ gas atmosphere to be hydrogenated, then was subjected to a dehydrogenation treatment at 800° C. until a partial pressure of the $H_2$ gas in the atmosphere became 1 Pa or lower, and subsequently was cooled down to obtain an HDDR alloy. The HDDR treatment was not performed on raw material alloys of samples according to Experimental Examples 1-18 to 1-21.

Next, the following hydrogen crush was performed. Specifically, hydrogen was absorbed into the HDDR alloy at room temperature, the HDDR alloy was subjected to a heat treatment for one hour at 300° C. in an Ar atmosphere and then was cooled down to room temperature, and then a heat treatment is performed again in a vacuum atmosphere at 300° C. for one hour. Then, a pulverized product obtained was cooled down to room temperature in the Ar atmosphere.

Next, as a carbon source in a grain boundary phase and a pulverization aid, 0.5% by mass to 2.0% by mass of lauric acid amide was added to a coarsely pulverized powder, and fine pulverization was performed by using a jet mill. With regard to the fine pulverization, a rotation speed of a classification rotor of the jet mill was adjusted so that an average particle size of a finely pulverized powder becomes 1.5 μm with respect to samples according to Experimental Examples 1-1 to 1-18, and 1-20, and the average particle size of the finely pulverized powder becomes 2.0 μm with respect to samples according to Experimental Examples 1-19 and 1-21.

The finely pulverized powder obtained was filled in a mold disposed in an electromagnet, and molding in a magnetic field in which a pressure of 120 MPa was applied while applying a magnetic field of 1200 kA/m was performed, thereby obtaining a green compact.

Then, the green compact obtained was kept in vacuum at a temperature shown in Table 2 for four hours to be sintered, and was rapidly cooled down to obtain a sintered magnet (R-T-B-based magnet). In addition, the sintered magnet obtained was subjected to an aging treatment in an Ar atmosphere at 590° C. for one hour, thereby obtaining a sample of the R-T-B-based magnet of each of Experimental Examples 1-1 to 1-21.

Note that, in this embodiment, respective processes from the HDDR treatment to the sintering were performed in an inert gas atmosphere in which an oxygen concentration is less than 50 ppm.

Results of composition analysis with respect to the obtained samples of Experimental Examples 1-1 to 1-21 are shown in Table 1. Note that, the amount of each element contained shown in Table 1 was measured by ICP atomic emission spectroscopy (ICP-AES). In addition, x and y were calculated from the composition analysis results, and a relationship of x and y was plotted in FIG. 3.

TABLE 1

| | Magnet composition (at %) | | | | | | | | | | | | | | |
|---|---|---|---|---|---|---|---|---|---|---|---|---|---|---|---|
| | R | | | | | | T | | | M | | | | | |
| Sample number | Nd | Pr | Y | Ce | La | Sm | Fe | Co | B | Ga | Al | C | Cu | Nb | Zr |
| Experimental Example 1-1 | 14.15 | 0.00 | 0.00 | 0.00 | 0.00 | 1.66 | 75.96 | 0.00 | 4.96 | 1.52 | 0.47 | 1.15 | 0.03 | 0.11 | 0.00 |
| Experimental Example 1-2 | 14.13 | 0.00 | 0.00 | 0.00 | 0.00 | 1.52 | 75.46 | 0.00 | 4.91 | 1.51 | 0.45 | 1.89 | 0.04 | 0.09 | 0.00 |
| Experimental Example 1-3 | 14.04 | 0.00 | 0.00 | 0.00 | 0.00 | 1.56 | 74.94 | 0.00 | 4.90 | 1.50 | 0.45 | 2.47 | 0.03 | 0.11 | 0.00 |
| Experimental Example 1-4 | 13.77 | 0.00 | 0.00 | 0.00 | 0.00 | 1.56 | 74.63 | 0.00 | 4.82 | 1.49 | 0.45 | 3.13 | 0.03 | 0.10 | 0.00 |
| Experimental Example 1-5 | 13.87 | 0.00 | 0.00 | 0.00 | 0.00 | 1.71 | 73.92 | 0.00 | 4.78 | 1.48 | 0.44 | 3.70 | 0.04 | 0.06 | 0.00 |
| Experimental Example 1-6 | 13.64 | 0.00 | 0.00 | 0.00 | 0.00 | 1.75 | 73.73 | 0.00 | 4.79 | 1.48 | 0.44 | 4.06 | 0.03 | 0.08 | 0.00 |
| Experimental Example 1-7 | 13.45 | 0.00 | 0.00 | 0.00 | 0.00 | 1.54 | 73.56 | 0.00 | 4.82 | 1.47 | 0.44 | 4.56 | 0.04 | 0.11 | 0.00 |
| Experimental Example 1-8 | 14.35 | 0.00 | 0.00 | 0.00 | 0.00 | 1.61 | 75.34 | 0.00 | 4.91 | 0.09 | 0.44 | 3.16 | 0.03 | 0.07 | 0.00 |
| Experimental Example 1-9 | 14.41 | 0.00 | 0.00 | 0.00 | 0.00 | 1.65 | 74.98 | 0.00 | 4.91 | 0.30 | 0.45 | 3.15 | 0.03 | 0.11 | 0.00 |
| Experimental Example 1-10 | 14.06 | 0.00 | 0.00 | 0.00 | 0.00 | 1.34 | 75.35 | 0.00 | 4.89 | 0.61 | 0.44 | 3.16 | 0.04 | 0.10 | 0.00 |
| Experimental Example 1-11 | 14.07 | 0.00 | 0.00 | 0.00 | 0.00 | 1.60 | 74.84 | 0.00 | 4.89 | 0.89 | 0.46 | 3.14 | 0.03 | 0.08 | 0.00 |
| Experimental Example 1-12 | 13.80 | 0.00 | 0.00 | 0.00 | 0.00 | 1.50 | 74.88 | 0.00 | 4.87 | 1.20 | 0.44 | 3.15 | 0.03 | 0.13 | 0.00 |
| Experimental Example 1-13 | 14.03 | 0.00 | 0.00 | 0.00 | 0.00 | 1.66 | 73.99 | 0.00 | 4.84 | 1.78 | 0.44 | 3.11 | 0.03 | 0.12 | 0.00 |
| Experimental Example 1-14 | 14.18 | 0.00 | 0.00 | 0.00 | 0.00 | 1.58 | 73.63 | 0.00 | 4.80 | 2.14 | 0.44 | 3.09 | 0.03 | 0.12 | 0.00 |

TABLE 1-continued

| | Magnet composition (at %) | | | | | | | | | | | | | | |
| --- | --- | --- | --- | --- | --- | --- | --- | --- | --- | --- | --- | --- | --- | --- | --- |
| | R | | | | | T | | | M | | | | | | |
| Sample number | Nd | Pr | Y | Ce | La | Sm | Fe | Co | B | Ga | Al | C | Cu | Nb | Zr |
| Experimental Example 1-15 | 14.06 | 0.00 | 0.00 | 0.00 | 0.00 | 1.42 | 73.54 | 0.00 | 4.81 | 2.50 | 0.44 | 3.09 | 0.03 | 0.10 | 0.00 |
| Experimental Example 1-16 | 13.77 | 0.00 | 0.00 | 0.00 | 0.00 | 1.56 | 74.63 | 0.00 | 4.82 | 1.94 | 0.00 | 3.13 | 0.03 | 0.10 | 0.00 |
| Experimental Example 1-17 | 15.36 | 0.00 | 0.00 | 0.00 | 0.00 | 1.79 | 72.48 | 0.55 | 4.25 | 1.68 | 0.69 | 3.04 | 0.07 | 0.00 | 0.09 |
| Experimental Example 1-18 | 15.36 | 0.00 | 0.00 | 0.00 | 0.00 | 1.79 | 72.48 | 0.55 | 4.25 | 1.68 | 0.69 | 3.04 | 0.07 | 0.00 | 0.09 |
| Experimental Example 1-19 | 15.36 | 0.00 | 0.00 | 0.00 | 0.00 | 1.79 | 72.48 | 0.55 | 4.25 | 1.68 | 0.69 | 3.04 | 0.07 | 0.00 | 0.09 |
| Experimental Example 1-20 | 13.77 | 0.00 | 0.00 | 0.00 | 0.00 | 1.56 | 74.63 | 0.00 | 4.82 | 1.49 | 0.45 | 3.13 | 0.03 | 0.10 | 0.00 |
| Experimental Example 1-21 | 13.77 | 0.00 | 0.00 | 0.00 | 0.00 | 1.56 | 74.63 | 0.00 | 4.82 | 1.49 | 0.45 | 3.13 | 0.03 | 0.10 | 0.00 |

With respect to the obtained samples, D50 of the main phase crystal grains was measured as follows.

First, on a cut-out surface of each of the samples, a region of 10 μm square was observed with an SEM to obtain a backscattered electron image. The backscattered electron image that was obtained was input to image analysis software, contours of 200 main phase crystal grains were extracted, and an area of the main phase crystal grains was obtained. An equivalent circle diameter in an area in which an accumulative distribution of areas of the main phase crystal grains becomes 50% was set as D50. Results are shown in Table 2.

(Calculation of Area Ratio of Void)

First, a surface of a cross-section of each of the obtained samples was grinded with ion milling to exclude an influence of oxidation of an outermost surface, and then the cross-section after ion milling was analyzed with an electron probe micro analyzer (EPMA) to obtain a backscattered electron image with respect to a region of 40 μm square. The backscattered electron image obtained was binarized at a predetermined level, a void portion was identified, and an area of the void portion was calculated. The calculated area of the void portion was divided by the sum of an area of the main phase crystal grain, an area of the grain boundary phase, and the area of the void portion to calculate an area ratio occupied by the void in a total area. Results are shown in Table 2.

(Identification of Phase Constituting Grain Boundary Phase)

After obtaining a backscattered electron image in the same manner as described above, element mapping (256 points×256 points) of the region was performed. From the backscattered electron image and the element mapping data obtained, the R-T-M-C phase, the R-O-C-N phase, and the R-T-B-C phase which occupy the grain boundary phase were identified in the following order.

An image of the backscattered electron image from which the void portion was removed was binarized, a main phase crystal grain region and a grain boundary phase region were identified, and an area of the main phase crystal grain and an area of the grain boundary phase were calculated. Note that, binarization was performed on the basis of signal intensity of the backscattered electron image.

From the backscattered electron image and the element mapping data obtained, different contrast regions which constitute the main phase crystal grain and the grain boundary phase were specified. Next, in the main phase crystal grain region, point analysis with the EPMA was performed to calculate an average value and a standard deviation of characteristic X-ray intensity of respective elements of R, T, M, B, C, O, and N. With respect to each of the respective elements, a value obtained by adding three times of the standard deviation to the average value of the characteristic X-ray intensity in the main phase crystal grain region was calculated, and this was set as a content ratio (at %) of each element in the main phase crystal grain region. Note that, content ratios of the rare earth element, the transition metal element, the element M, and carbon in the main phase crystal grain region were set as $R_{MP}$, $T_{MP}$, $M_{MP}$, and $C_{MP}$, respectively.

Note that, in order to measure $C_{MP}$ with accuracy, in the sample of Experimental Example 1-12, with respect to five different main phase crystal grains, $C_{MP}$ and $T_{MP}$ were measured by using the 3DAP, and $C_{MP}/T_{MP}$ was calculated. $C_{MP}/T_{MP}$ was 0.0048.

Next, with respect to different contrast regions which constitute the grain boundary phase, point analysis with the EPMA was performed, and a region in which the value of the characteristic X-ray intensity is greater than the value (average value+3×standard deviation) of the characteristic X-ray intensity in the main phase crystal grain region, and a region in which the value of the characteristic X-ray intensity is less than the value (average value+3×standard deviation) of the characteristic X-ray intensity in the main phase crystal grain region were specified with respect to the respective elements (R, T, M, B, C, O, and N).

In the different contrast regions which constitute the grain boundary phase, a region where regions in which concentrations of elements R, M, and C are greater than those in the main phase crystal grain, and a region where a concentration of T is smaller than that in the main phase crystal grain overlap each other was set as the R-T-M-C phase in the grain boundary phase.

In addition, in the different contrast regions which constitute the grain boundary phase, a region where regions in which concentrations of elements R, C, O, and N are greater than those in the main phase crystal grain overlap each other was set as the R-C-O-N phase in the grain boundary phase.

Moreover, in the different contrast regions which constitute the grain boundary phase, a region where regions in which concentrations of elements of R, B, and C are greater than those in the main phase crystal grain, and a region where a concentration of T is smaller than that in the main phase crystal grain overlap each other was set as the R-T-B-C phase in the grain boundary phase.

Note that, in the R-T-M-C phase identified as described above, quantitative analysis was performed to calculate content ratios ($R_{RC}$, $T_{RC}$, $M_{RC}$, and $C_{RC}$) of respective elements. The quantitative analysis was performed on three points in the R-T-M-C phase, and values of $M_{RC}/R_{RC}$ and $C_{RC}/R_{RC}$ of the samples were calculated from an average value of measurement values. Results are shown in Table 2.

In addition, with respect to an individual closed region belonging to the R-rich phase, the number of pixels is calculated. A phase in which the number of pixels in the R-T-M-C phase and the R-T-B-C phase is the greatest was specified. Furthermore, an area of one pixel is calculated from a scale bar of the backscattered electron image, and the maximum area of the R-rich phase was calculated from the product of the number of pixels and the area of the one pixel. In the Examples, the R-rich phase exhibiting the maximum area was the R-T-M-C phase or the R-T-B-C phase. Results are shown in Table 2.

Next, the CV value of the carbon concentration distribution was calculated from the obtained element mapping data in the following order. A standard deviation of the detection amount of carbon and an average value of the detection amount of carbon were calculated on the basis of information of a detection amount of carbon (carbon concentration) obtained by plane analysis, and the CV value was calculated from the following expression. Results are shown in Table 2.

CV value (%)=standard deviation of detection amount of carbon/average value of detection amount of carbon (Magnetic Characteristics)

Next, the magnetizing field Hmag of the obtained samples, and the coercivity HcJ and the remanence Br in the magnetizing field Hmag were measured by using a BH tracer as follows.

Figure 5:
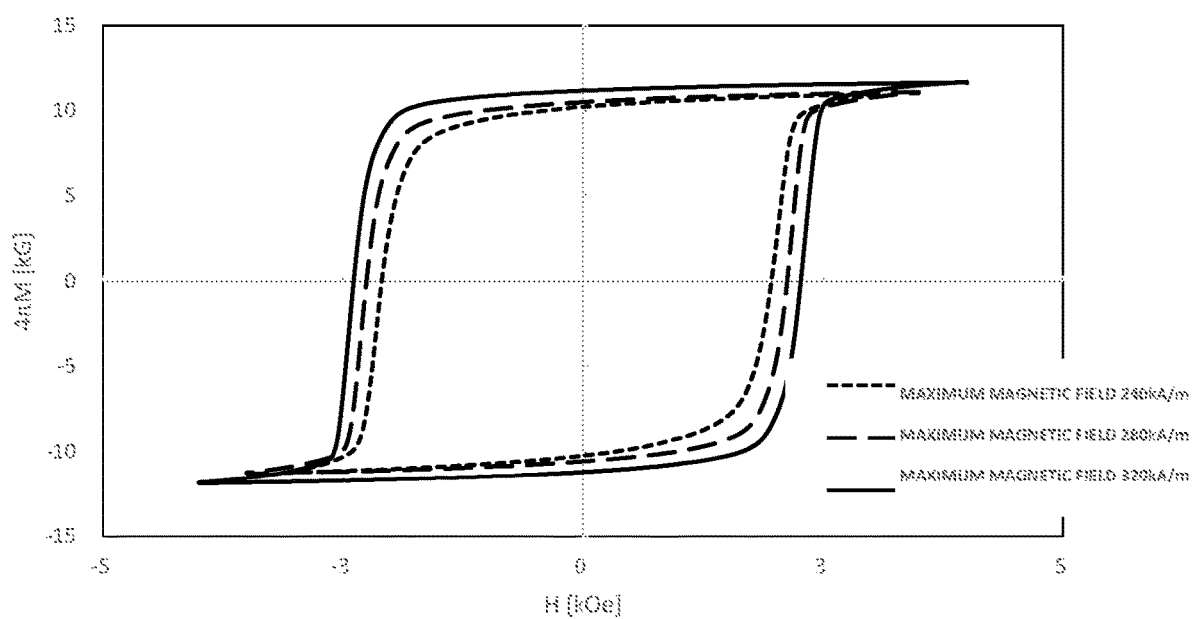
FIG. 5 is a view showing a minor loop in a case where a magnetic field is set to 240 kA/m, 280 kA/m, and 320 kA/m in examples of the invention.

First, the minor loop was measured while increasing the maximum magnetic field with constant intervals from a value of the same magnetic field as coercivity $HcJ_{-30\ kOe}$ of a J-H hysteresis curve (major loop) measured at the maximum magnetic field 2390 kA/m, and then a magnetic field in which the minor loop is closed and has a symmetrical shape was obtained, and this magnetic field was set as the magnetizing field Hmag. Measurement results of the minor loop relating to Experimental Example 1-9 are shown in Table 5. In FIG. 5, even in a case where the magnetic field is any of 240 kA/m, 280 kA/m, and 320 kA/m, a closed minor loop was obtained, but a minor loop having a symmetrical shape was only one obtained in the magnetic field of 320 kA/m. Accordingly, the magnetizing field Hmag of Experimental Example 1-9 was 320 kA/m. In the Examples, a sample in which Hmag is 800 kA/m or less was determined as "satisfactory". Results are shown in Table 3.

Next, coercivity after magnetized in the magnetizing field Hmag was set as $HcJ_{Hmag}$, and a remanence after magnetized in the magnetizing field Hmag was set as $Br_{Hmag}$. In the Examples, a sample in which $HcJ_{Hmag}$ is 576 kA/m or less was determined as "satisfactory". In addition, a sample in which $Br_{Hmag}$ is 0.91 T or more was determined as "satisfactory". Results are shown in Table 3.

A temperature coefficient of the coercivity of the obtained sample was measured as follows. First, coercivity in a minimum magnetizing field of a sample at room temperature (23° C.) was measured, and this was set as $HcJ_{23°\ C.}$. Next, the sample was heated to 180° C. and was kept for approximately five minutes. In a state in which the temperature of the sample was stabilized, coercivity at the minimum magnetizing field was measured, and this was set as $HcJ_{180°\ C.}$. Subsequently, a temperature coefficient β (%/° C.) of the coercivity was set to the following expression.

β=($HcJ_{2°\ C.}$-$HcJ_{23°\ C.}$)/$HcJ_{23°\ C.}$/(180-23)*100

For use as the variable magnetic flux magnet, the temperature coefficient β of the coercivity is preferably at least −0.45%/° C. or more, and more preferably −0.40%/° C. or more.

Figure 6:
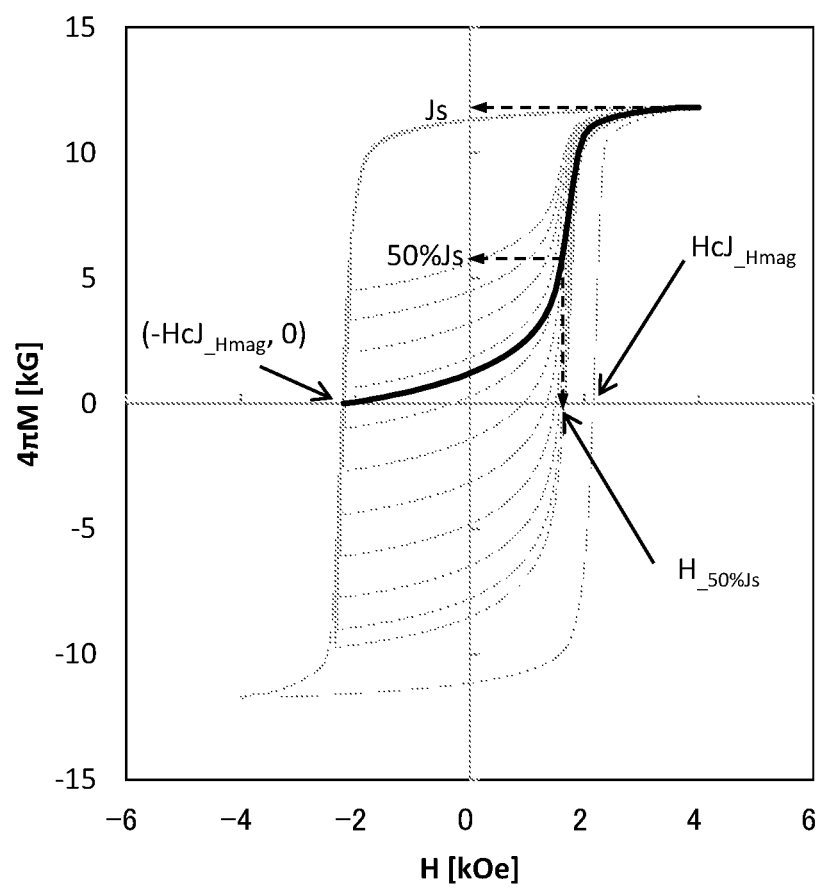
FIG. 6 is a view showing minor curve flatness in the minor loop in a case where a magnetizing field is 320 kA/m in examples of the invention.

Next, the minor curve flatness was measured as follows. FIG. 6 shows a minor loop group measured while changing a negative reverse magnetic field Hrev with respect to Experimental Example 1-9. Among magnetization curves obtained starting from a plurality of negative reverse magnetic fields Hrev, with respect to a magnetization curve (a bold line in FIG. 6) obtained starting from an operating point (−$HcJ_{Hmag}$, 0) which corresponds to coercivity of the minor loop in the second and third quadrants, a ratio of coercivity of the minor loop $HcJ_{Hmag}$ and $H_{-50\%\ Js}$, which is a magnetic field that is 50% of magnetic polarization Js after magnetized in the magnetizing field Hmag, was set as the minor curve flatness (100×$H_{-50\%\ Js}$/$HcJ_{Hmag}$). In the Examples, a sample in which the minor curve flatness is 63% or more was determined as "satisfactory". Results are shown in Table 3.

(Motor No-Load Characteristic Evaluation)

Motor characteristics in the case of using magnets of Experimental Examples 1-1 to 1-21 as the variable magnetic flux magnet 13 of a motor illustrated in FIG. 4 were evaluated at room temperature. As the fixed magnetic flux magnets 14a and 14b, an NdFeB magnet (HcJ=2000 kA/m, Br=1.26 T) was used. The thickness of the variable magnetic flux magnet 13 in a magnetization direction was set to 5 mm, the thickness of each of the fixed magnetic flux magnets 14a and 14b in the magnetization direction was set to 0.5 mm, and the thickness of the entirety of the stacked magnet 15 in the magnetization direction was set to 6 mm. At that time, a permissible range the d-axis current was −60 to 60 A, and a range of the magnetic field applicable to the variable magnetic flux magnet by the d-axis current is −130 to 130 kA/m.

Figure 7:
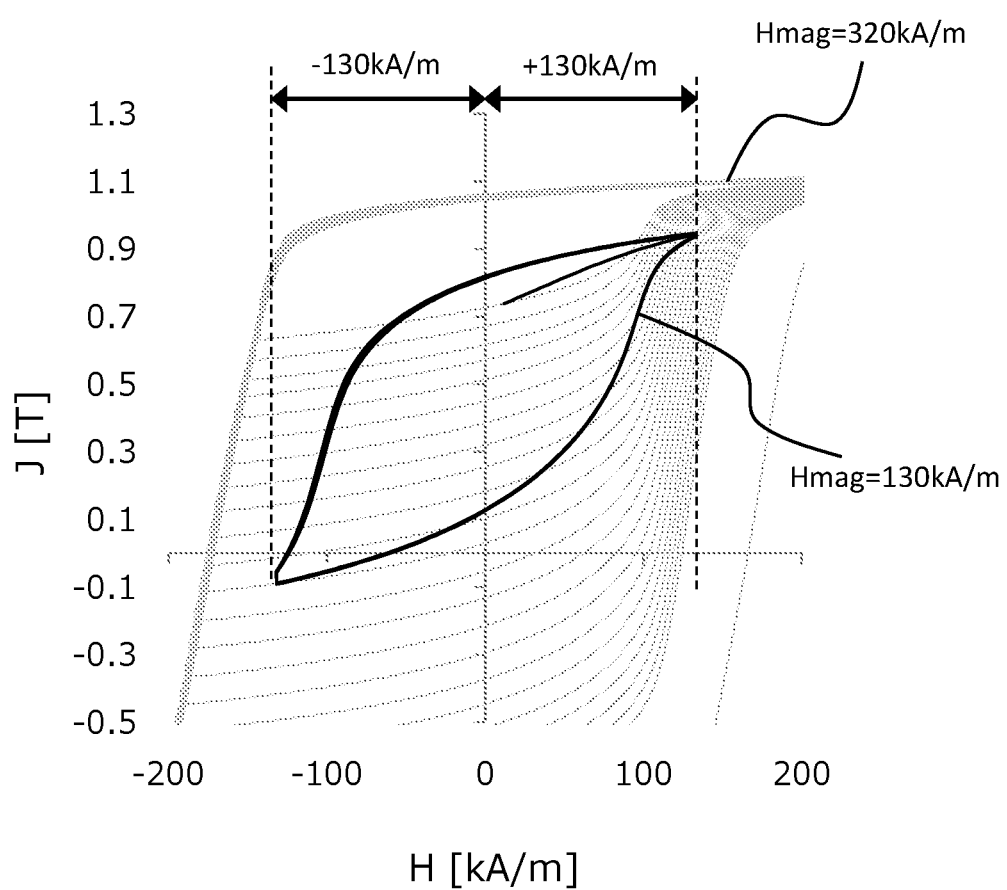
FIG. 7 is a view showing a minor loop in a case where a magnetization variation range of the variable magnetic flux magnet is limited to a positive region of the magnetization in FIG. 5.

In the J-H curve of the variable magnetic flux magnet of Experimental Example 1-9 shown in FIG. 5, the magnetizing field Hmag required for the magnet magnetization to be a symmetrical hysteresis from a positive region to a negative region is 320 kA/m. On the other hand, the magnetic field range by the d-axis current that is applicable by the motor is −130 to 130 kA/m, which is lower than the magnetizing field Hmag. However, as shown in FIG. 7, when a magnetization variation range of the variable magnetic flux magnet is limited to the positive region of the magnetization, even at 130 kA/m that is less than the half of the magnetizing field Hmag, a magnetization variation amount between in a magnetization state and in a demagnetization state can be made to be relatively large. When utilizing this property, the motor characteristic evaluation became possible with respect to a magnet of which Hmag is 130 kA/m or more.

Figure 8:
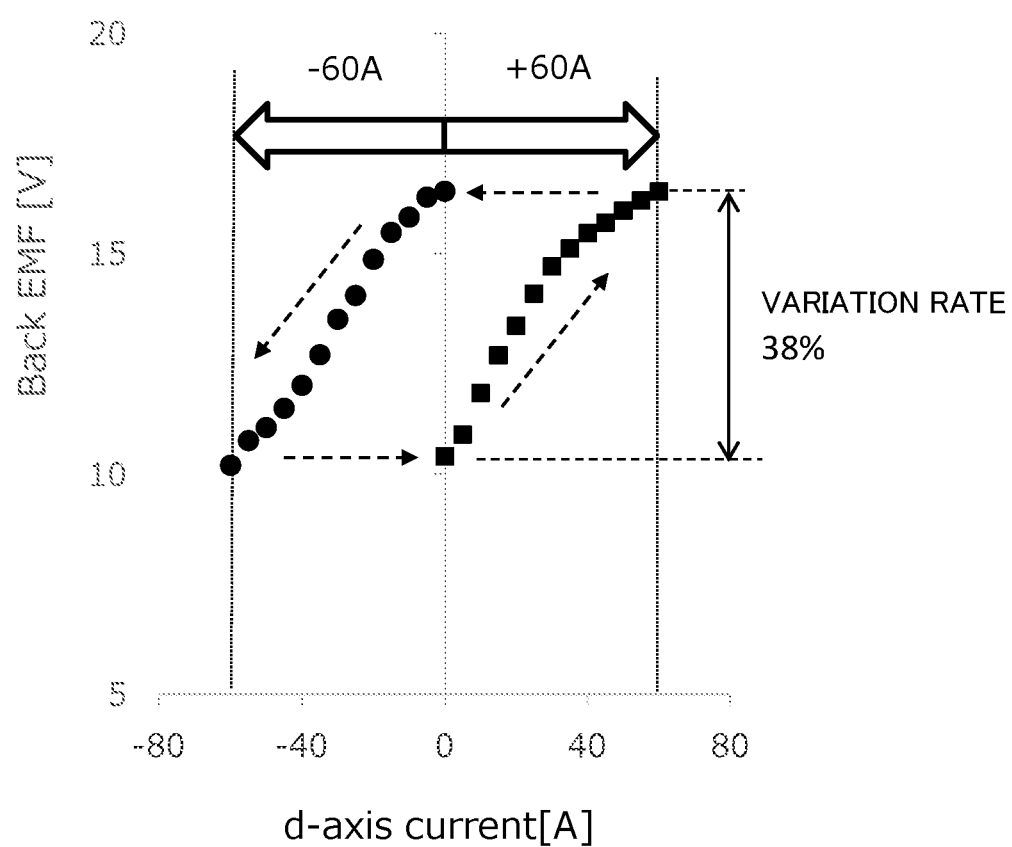
FIG. 8 is a view showing induced voltage characteristics of a motor evaluation device in examples of the invention.

Each of the variable magnetic flux magnets of Experimental Examples 1-1 to 1-21 was mounted on a motor evaluating device, and induced voltage characteristics in a no-load state after magnetization and demagnetization were measured as follows. First, after setting the variable magnetic flux magnet to a maximum magnetized state by applying a positive maximum d-axis current of 60 A, and an induced voltage between U-V phases at the rotation speed of 600 rpm is measured in a no-load state. Next, an induced voltage in a no-load state after application of the d-axis current is measured while increasing a negative d-axis current up to −60 A with constant intervals. According to this, a variation of the induced voltage at the second quadrant in the course of demagnetization is obtained. Next, an induced voltage in a no-load state after application of the d-axis current is measured while increasing a positive d-axis current up to 60 A with constant intervals. According to this, a variation of the induced voltage at the first quadrant in the course of magnetization is obtained. A variation rate between the maximum value and the minimum value of the induced voltages obtained in the measurement was derived as an induced voltage variation rate after magnetization and demagnetization of a magnet. In the Examples, a sample in which the induced voltage variation rate is 30% or more was determined as "satisfactory". Results are shown in Table 3. In addition, induced voltage characteristics of the motor evaluating device on which the variable magnetic flux magnet of Experimental Example 1-9 is mounted are shown in FIG. 8.

Figure 9:
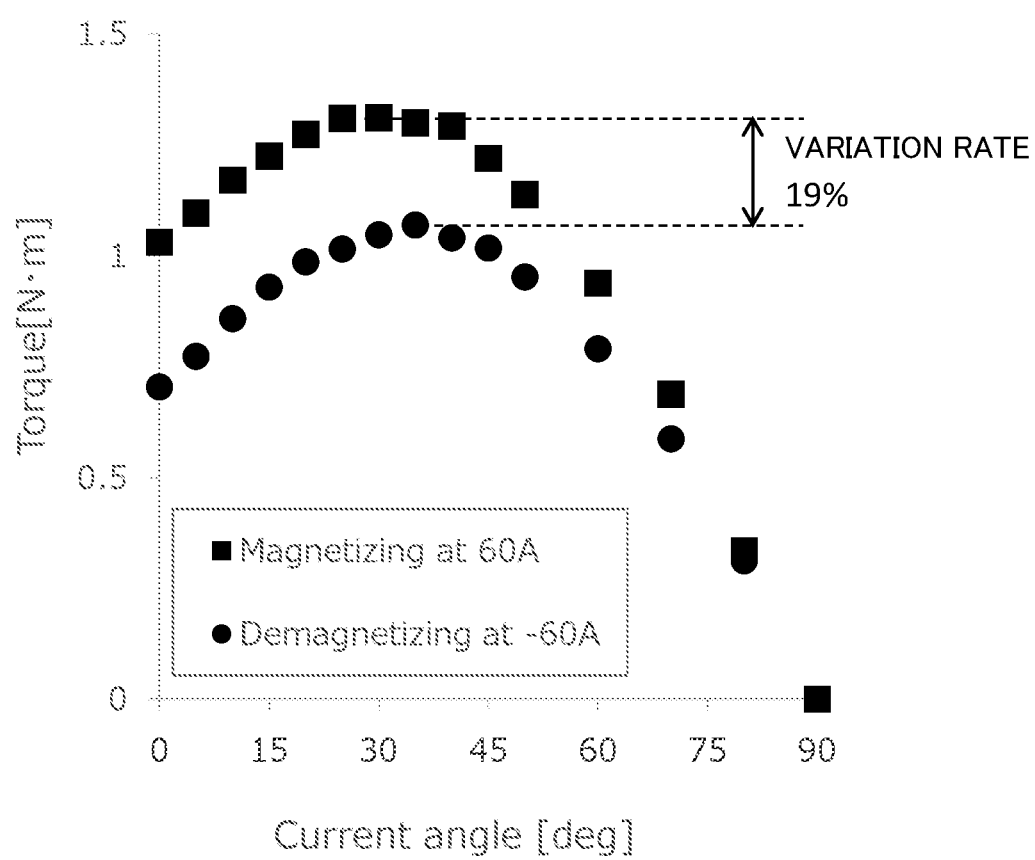
FIG. 9 is a view showing torque characteristics of the motor evaluation device in examples of the invention.

Each of the variable magnetic flux magnets of Experimental Examples 1-1 to 1-21 was mounted on the motor evaluating device, and with respect to each of a magnetization state by a d-axis current of 60 A, and a demagnetization state by a d-axis current of −60 A, torque characteristics with respect to a current phase 3 were measured, and a torque variation rate after magnetization and demagnetization of the magnet was derived from a maximum torque value in each state. In the Examples, a sample in which the torque variation rate is 15% or more was determined as "satisfactory". Results are shown in Table 3. In addition, torque characteristics of the motor evaluating device on which the variable magnetic flux magnet of Experimental Example 1-9 are shown in FIG. 9.

TABLE 2

| | R-T-B-based magnet | | | | | | | | |
|---|---|---|---|---|---|---|---|---|---|
| | Sintered magnet | | | | | | | | |
| | R | | | | | | | Sintering | Area ratio |
| | R1 | | R2 | | | | | temperature | of void |
| | Kind of element | 1-x-y | Kind of element | x | Sm y | d/b | e/b | (° C.) | (%) |
| Experimental Example 1-1 | Nd | 0.900 | — | 0.000 | 0.100 | 0.026 | 0.015 | 790 | 0 |
| Experimental Example 1-2 | Nd | 0.900 | — | 0.000 | 0.100 | 0.026 | 0.025 | 800 | 0 |
| Experimental Example 1-3 | Nd | 0.900 | — | 0.000 | 0.100 | 0.026 | 0.033 | 810 | 0 |
| Experimental Example 1-4 | Nd | 0.900 | — | 0.000 | 0.100 | 0.026 | 0.042 | 820 | 0 |
| Experimental Example 1-5 | Nd | 0.900 | — | 0.000 | 0.100 | 0.026 | 0.050 | 850 | 0 |
| Experimental Example 1-6 | Nd | 0.900 | — | 0.000 | 0.100 | 0.026 | 0.055 | 860 | 5.3 |
| Experimental Example 1-7 | Nd | 0.900 | — | 0.000 | 0.100 | 0.026 | 0.062 | 900 | 8.3 |
| Experimental Example 1-8 | Nd | 0.900 | — | 0.000 | 0.100 | 0.007 | 0.042 | 880 | 0 |
| Experimental Example 1-9 | Nd | 0.900 | — | 0.000 | 0.100 | 0.010 | 0.042 | 880 | 0 |
| Experimental Example 1-10 | Nd | 0.900 | — | 0.000 | 0.100 | 0.014 | 0.042 | 860 | 0 |
| Experimental Example 1-11 | Nd | 0.900 | — | 0.000 | 0.100 | 0.018 | 0.042 | 840 | 0 |
| Experimental Example 1-12 | Nd | 0.900 | — | 0.000 | 0.100 | 0.022 | 0.042 | 830 | 0 |
| Experimental Example 1-13 | Nd | 0.900 | — | 0.000 | 0.100 | 0.030 | 0.042 | 820 | 0 |
| Experimental Example 1-14 | Nd | 0.900 | — | 0.000 | 0.100 | 0.035 | 0.042 | 810 | 0 |
| Experimental Example 1-15 | Nd | 0.900 | — | 0.000 | 0.100 | 0.040 | 0.042 | 800 | 0 |
| Experimental Example 1-16 | Nd | 0.900 | — | 0.000 | 0.100 | 0.026 | 0.042 | 820 | 0 |
| Experimental Example 1-17 | Nd | 0.900 | — | 0.000 | 0.100 | 0.032 | 0.042 | 820 | 0 |
| Experimental Example 1-18 | Nd | 0.900 | — | 0.000 | 0.100 | 0.032 | 0.042 | 850 | 0 |
| Experimental Example 1-19 | Nd | 0.900 | — | 0.000 | 0.100 | 0.032 | 0.042 | 870 | 0 |
| Experimental Example 1-20 | Nd | 0.900 | — | 0.000 | 0.100 | 0.026 | 0.042 | 870 | 0 |
| Experimental Example 1-21 | Nd | 0.900 | — | 0.000 | 0.100 | 0.026 | 0.042 | 890 | 0 |

| | R-T-B-based magnet | | | | | | |
|---|---|---|---|---|---|---|---|
| | Main phase $R_2T_{14}B$ Main phase crystal grain size D50 (μm) | Grain boundary phase | | | | | |
| | | R-T-M-C Phase | | | R-OCN phase Area ratio (%) | R-T-B-C phase | |
| | | $M_{RC}/T_{RC}$ | $C_{RC}/T_{RC}$ | Maximum area (μm²) | | Presence or absence | Maximum area (μm²) | CV value C |
| Experimental Example 1-1 | 1.50 | — | — | — | 60 | Absent | — | 0.36 |
| Experimental Example 1-2 | 1.00 | 0.45 | 0.10 | 5.8 | 57 | Present | 11.5 | 0.49 |
| Experimental Example 1-3 | 0.60 | 0.32 | 0.31 | 9.8 | 52 | Present | 13.2 | 0.50 |
| Experimental Example 1-4 | 0.43 | 0.25 | 0.75 | 41.2 | 29 | Present | 16.0 | 0.53 |
| Experimental Example 1-5 | 0.30 | 0.20 | 0.80 | 70.0 | 10 | Present | 44.7 | 0.72 |
| Experimental Example 1-6 | 0.25 | 0.07 | 0.87 | 75.8 | 5 | Present | 68.3 | 0.87 |
| Experimental Example 1-7 | 0.22 | 0.05 | 0.92 | 80.1 | 0 | Present | 70.4 | 0.90 |
| Experimental Example 1-8 | 0.70 | — | — | — | 39 | Present | 60.0 | 0.85 |
| Experimental Example 1-9 | 0.60 | 0.07 | 0.86 | 15.4 | 38 | Present | 55.3 | 0.81 |
| Experimental Example 1-10 | 0.56 | 0.10 | 0.83 | 23.8 | 38 | Present | 47.2 | 0.77 |
| Experimental Example 1-11 | 0.51 | 0.13 | 0.80 | 27.3 | 37 | Present | 29.4 | 0.67 |
| Experimental Example 1-12 | 0.45 | 0.26 | 0.79 | 34.5 | 34 | Present | 19.7 | 0.59 |
| Experimental Example 1-13 | 0.40 | 0.56 | 0.72 | 49.3 | 29 | Present | 15.2 | 0.57 |
| Experimental Example 1-14 | 0.36 | 0.65 | 0.70 | 60.7 | 12 | Present | 14.2 | 0.70 |
| Experimental Example 1-15 | 0.31 | 0.71 | 0.65 | 83.5 | 0 | Present | 13.6 | 0.86 |
| Experimental Example 1-16 | 0.45 | 0.27 | 0.72 | 43.7 | 28 | Present | 16.8 | 0.54 |
| Experimental Example 1-17 | 0.50 | 0.52 | 0.70 | 49.3 | 30 | Present | 15.3 | 0.57 |
| Experimental Example 1-18 | 1.50 | 0.54 | 0.71 | 49.8 | 29 | Present | 16.2 | 0.57 |
| Experimental Example 1-19 | 2.00 | 0.55 | 0.69 | 49.8 | 29 | Present | 15.8 | 0.57 |
| Experimental Example 1-20 | 1.50 | 0.24 | 0.74 | 41.8 | 30 | Present | 16.3 | 0.53 |
| Experimental Example 1-21 | 2.00 | 0.26 | 0.73 | 42.3 | 29 | Present | 15.7 | 0.53 |

TABLE 2-continued method as in Experimental Example 1. Results of composition analysis on the samples of Experimental Examples 2-1 to 2-55 are shown in Tables 4 and 5. In addition, x and y were calculated from the composition analysis results, and a relationship of x and y was plotted in FIG. 3. Furthermore, evaluation results of the samples 2-1 to 2-55 are shown in Tables 6 to 9.

TABLE 3

| | R-T-B-based magnet | | | | | Motor no-load characteristics | | |
|---|---|---|---|---|---|---|---|---|
| | Magnetic characteristics | | | | | Induced voltage | | |
| | Magnetizing field $H_{mag}$ (kA/m) | Coercivity $HcJ_{\_Hmag}$ (kA/m) | Temperature coefficient β of coercivity (%/° C.) | Remanence $Br_{\_Hmag}$ (T) | Minor curve flatness $H_{\_50\%Js}/HcJ_{\_Hmag}$ (%) | variation rate after magnetization and demagnetization of magnet (%) | Torque variation rate after magnetization and demagnetization of magnet (%) | |
| Experimental Example 1-1 | 400 | 80 | −0.60 | 1.29 | 15 | 0 | 0 | Comparative Example |
| Experimental Example 1-2 | 320 | 150 | −0.37 | 1.23 | 67 | 42 | 20 | Example |
| Experimental Example 1-3 | 280 | 176 | −0.36 | 1.15 | 80 | 45 | 25 | Example |
| Experimental Example 1-4 | 280 | 208 | −0.38 | 1.13 | 85 | 47 | 27 | Example |
| Experimental Example 1-5 | 380 | 271 | −0.43 | 1.11 | 86 | 45 | 25 | Example |
| Experimental Example 1-6 | 480 | 320 | −0.50 | 0.99 | 87 | 44 | 21 | Example |
| Experimental Example 1-7 | 560 | 368 | −0.53 | 0.82 | 90 | 12 | 6 | Comparative Example |
| Experimental Example 1-8 | 400 | 160 | −0.45 | 1.20 | 52 | 29 | 14 | Comparative Example |
| Experimental Example 1-9 | 320 | 176 | −0.45 | 1.12 | 69 | 38 | 19 | Example |
| Experimental Example 1-10 | 300 | 184 | −0.44 | 1.11 | 80 | 45 | 25 | Example |
| Experimental Example 1-11 | 290 | 192 | −0.41 | 1.11 | 81 | 46 | 26 | Example |
| Experimental Example 1-12 | 280 | 200 | −0.39 | 1.11 | 83 | 47 | 26 | Example |
| Experimental Example 1-13 | 300 | 216 | −0.39 | 1.10 | 87 | 47 | 27 | Example |
| Experimental Example 1-14 | 310 | 224 | −0.40 | 0.99 | 90 | 44 | 21 | Example |
| Experimental Example 1-15 | 360 | 240 | −0.47 | 0.81 | 92 | 29 | 14 | Comparative Example |
| Experimental Example 1-16 | 280 | 208 | −0.38 | 1.14 | 86 | 47 | 27 | Example |
| Experimental Example 1-17 | 273 | 192 | −0.39 | 1.11 | 78 | 46 | 26 | Example |
| Experimental Example 1-18 | 244 | 172 | −0.39 | 1.10 | 75 | 43 | 25 | Example |
| Experimental Example 1-19 | 227 | 160 | −0.39 | 1.12 | 70 | 41 | 23 | Example |
| Experimental Example 1-20 | 288 | 192 | −0.38 | 1.12 | 79 | 44 | 25 | Example |
| Experimental Example 1-21 | 264 | 176 | −0.40 | 1.13 | 74 | 40 | 22 | Example |

From Tables 2 and 3, it could be confirmed that characteristics required for the variable magnetic flux magnet are satisfactory when the R-T-M-C phase was formed.

In addition, in a case where the R-T-B-based magnet according to the Example was incorporated to a motor, it could be confirmed that the variation rates of the induced voltage and the torque after magnetization and demagnetization of a magnet increase.

Experimental Example 2

Samples were produced by the same method as in Experimental Example 1 except that raw materials were blended to obtain R-T-B-based magnets having compositions shown in Tables 4 and 5, and the samples were evaluated by the same

TABLE 4

| | Magnetic composition (at %) | | | | | | | | | | | | | | |
|---|---|---|---|---|---|---|---|---|---|---|---|---|---|---|---|
| | R | | | | | | T | | | M | | | | | |
| Sample number | Nd | Pr | Y | Ce | La | Sm | Fe | Co | B | Ga | Al | C | Cu | Nb | Zr |
| Experimental Example 2-1 | 13.87 | 0.00 | 1.60 | 0.00 | 0.00 | 0.00 | 74.44 | 0.00 | 4.86 | 1.53 | 0.42 | 3.17 | 0.03 | 0.07 | 0.00 |
| Experimental Example 2-2 | 11.06 | 0.00 | 4.76 | 0.00 | 0.00 | 0.00 | 74.11 | 0.00 | 4.82 | 1.55 | 0.47 | 3.09 | 0.03 | 0.09 | 0.00 |
| Experimental Example 2-3 | 7.69 | 0.00 | 7.66 | 0.00 | 0.00 | 0.00 | 74.63 | 0.00 | 4.88 | 1.45 | 0.43 | 3.15 | 0.03 | 0.08 | 0.00 |
| Experimental Example 2-4 | 4.70 | 0.00 | 10.92 | 0.00 | 0.00 | 0.00 | 74.44 | 0.00 | 4.84 | 1.43 | 0.41 | 3.17 | 0.03 | 0.06 | 0.00 |
| Experimental Example 2-5 | 1.58 | 0.00 | 14.30 | 0.00 | 0.00 | 0.00 | 74.23 | 0.00 | 4.79 | 1.48 | 0.43 | 3.10 | 0.03 | 0.06 | 0.00 |
| Experimental Example 2-6 | 13.87 | 0.00 | 0.00 | 1.58 | 0.00 | 0.00 | 74.43 | 0.00 | 4.83 | 1.51 | 0.46 | 3.21 | 0.03 | 0.08 | 0.00 |
| Experimental Example 2-7 | 11.11 | 0.00 | 0.00 | 4.79 | 0.00 | 0.00 | 74.16 | 0.00 | 4.82 | 1.46 | 0.42 | 3.11 | 0.03 | 0.10 | 0.00 |
| Experimental Example 2-8 | 7.74 | 0.00 | 0.00 | 7.74 | 0.00 | 0.00 | 74.39 | 0.00 | 4.86 | 1.55 | 0.46 | 3.14 | 0.03 | 0.09 | 0.00 |
| Experimental Example 2-9 | 4.64 | 0.00 | 0.00 | 10.85 | 0.00 | 0.00 | 74.53 | 0.00 | 4.88 | 1.45 | 0.41 | 3.12 | 0.03 | 0.09 | 0.00 |

TABLE 4-continued

| | Magnetic composition (at %) | | | | | | | | | | | | | | |
|---|---|---|---|---|---|---|---|---|---|---|---|---|---|---|---|
| | R | | | | | | T | | | M | | | | | |
| Sample number | Nd | Pr | Y | Ce | La | Sm | Fe | Co | B | Ga | Al | C | Cu | Nb | Zr |
| Experimental Example 2-10 | 1.53 | 0.00 | 0.00 | 13.90 | 0.00 | 0.00 | 74.65 | 0.00 | 4.85 | 1.46 | 0.44 | 3.05 | 0.03 | 0.10 | 0.00 |
| Experimental Example 2-11 | 15.06 | 0.00 | 0.00 | 0.00 | 0.00 | 0.79 | 74.29 | 0.00 | 4.87 | 1.43 | 0.40 | 3.06 | 0.03 | 0.07 | 0.00 |
| Experimental Example 2-12 | 13.13 | 0.00 | 0.00 | 1.54 | 0.00 | 0.77 | 74.63 | 0.00 | 4.85 | 1.41 | 0.43 | 3.12 | 0.04 | 0.07 | 0.00 |
| Experimental Example 2-13 | 11.89 | 0.00 | 0.00 | 3.15 | 0.00 | 0.79 | 74.08 | 0.00 | 4.83 | 1.47 | 0.46 | 3.20 | 0.03 | 0.10 | 0.00 |
| Experimental Example 2-14 | 10.13 | 0.00 | 0.00 | 4.68 | 0.00 | 0.78 | 74.43 | 0.00 | 4.86 | 1.44 | 0.44 | 3.14 | 0.03 | 0.07 | 0.00 |
| Experimental Example 2-15 | 7.16 | 0.00 | 0.00 | 7.97 | 0.00 | 0.80 | 74.14 | 0.00 | 4.79 | 1.47 | 0.47 | 3.09 | 0.03 | 0.07 | 0.00 |
| Experimental Example 2-16 | 3.93 | 0.00 | 0.00 | 10.94 | 0.00 | 0.79 | 74.28 | 0.00 | 4.86 | 1.51 | 0.42 | 3.19 | 0.03 | 0.06 | 0.00 |
| Experimental Example 2-17 | 2.30 | 0.00 | 0.00 | 12.58 | 0.00 | 0.79 | 74.47 | 0.00 | 4.87 | 1.44 | 0.40 | 3.03 | 0.03 | 0.09 | 0.00 |
| Experimental Example 2-18 | 14.43 | 0.00 | 0.00 | 0.00 | 0.00 | 1.17 | 74.45 | 0.00 | 4.84 | 1.53 | 0.44 | 3.04 | 0.03 | 0.06 | 0.00 |
| Experimental Example 2-19 | 12.62 | 0.00 | 0.00 | 1.54 | 0.00 | 1.15 | 74.73 | 0.00 | 4.84 | 1.46 | 0.44 | 3.07 | 0.04 | 0.12 | 0.00 |
| Experimental Example 2-20 | 13.77 | 0.00 | 0.00 | 0.00 | 0.00 | 1.56 | 74.63 | 0.00 | 4.82 | 1.49 | 0.45 | 3.13 | 0.03 | 0.10 | 0.00 |
| Experimental Example 2-21 | 12.34 | 0.00 | 0.00 | 1.54 | 0.00 | 1.54 | 74.37 | 0.00 | 4.85 | 1.54 | 0.46 | 3.22 | 0.03 | 0.11 | 0.00 |
| Experimental Example 2-22 | 10.81 | 0.00 | 0.00 | 3.07 | 0.00 | 1.54 | 74.48 | 0.00 | 4.88 | 1.43 | 0.40 | 3.23 | 0.03 | 0.13 | 0.00 |
| Experimental Example 2-23 | 9.48 | 0.00 | 0.00 | 4.74 | 0.00 | 1.58 | 74.17 | 0.00 | 4.85 | 1.46 | 0.47 | 3.11 | 0.03 | 0.11 | 0.00 |
| Experimental Example 2-24 | 6.15 | 0.00 | 0.00 | 7.71 | 0.00 | 1.54 | 74.42 | 0.00 | 4.86 | 1.53 | 0.45 | 3.18 | 0.03 | 0.13 | 0.00 |
| Experimental Example 2-25 | 3.09 | 0.00 | 0.00 | 10.68 | 0.00 | 1.53 | 74.45 | 0.00 | 4.86 | 1.53 | 0.49 | 3.23 | 0.03 | 0.11 | 0.00 |
| Experimental Example 2-26 | 1.59 | 0.00 | 0.00 | 12.74 | 0.00 | 1.63 | 74.22 | 0.00 | 4.85 | 1.42 | 0.43 | 3.02 | 0.03 | 0.07 | 0.00 |
| Experimental Example 2-27 | 13.31 | 0.00 | 0.00 | 0.00 | 0.00 | 1.91 | 74.81 | 0.00 | 4.85 | 1.48 | 0.42 | 3.14 | 0.03 | 0.06 | 0.00 |

TABLE 5

| | Magnetic composition (at %) | | | | | | | | | | | | | | |
|---|---|---|---|---|---|---|---|---|---|---|---|---|---|---|---|
| | R | | | | | | T | | | M | | | | | |
| Sample number | Nd | Pr | Y | Ce | La | Sm | Fe | Co | B | Ga | Al | C | Cu | Nb | Zr |
| Experimental Example 2-28 | 11.82 | 0.00 | 0.00 | 1.52 | 0.00 | 1.91 | 74.71 | 0.00 | 4.84 | 1.42 | 0.45 | 3.19 | 0.03 | 0.12 | 0.00 |
| Experimental Example 2-29 | 12.91 | 0.00 | 0.00 | 0.00 | 0.00 | 2.28 | 74.74 | 0.00 | 4.84 | 1.47 | 0.44 | 3.23 | 0.03 | 0.06 | 0.00 |
| Experimental Example 2-30 | 11.64 | 0.00 | 0.00 | 1.59 | 0.00 | 2.34 | 74.45 | 0.00 | 4.84 | 1.41 | 0.44 | 3.17 | 0.03 | 0.10 | 0.00 |
| Experimental Example 2-31 | 8.34 | 0.00 | 0.00 | 4.60 | 0.00 | 2.28 | 74.83 | 0.00 | 4.88 | 1.42 | 0.44 | 3.06 | 0.03 | 0.12 | 0.00 |
| Experimental Example 2-32 | 5.60 | 0.00 | 0.00 | 7.94 | 0.00 | 2.39 | 74.08 | 0.00 | 4.85 | 1.44 | 0.42 | 3.17 | 0.03 | 0.09 | 0.00 |
| Experimental Example 2-33 | 2.34 | 0.00 | 0.00 | 10.93 | 0.00 | 2.35 | 74.29 | 0.00 | 4.81 | 1.56 | 0.43 | 3.17 | 0.03 | 0.09 | 0.00 |
| Experimental Example 2-34 | 12.18 | 0.00 | 0.00 | 0.00 | 0.00 | 3.04 | 74.70 | 0.00 | 4.86 | 1.57 | 0.47 | 3.06 | 0.04 | 0.09 | 0.00 |
| Experimental Example 2-35 | 12.95 | 0.00 | 0.74 | 0.82 | 0.00 | 1.17 | 74.42 | 0.00 | 4.82 | 1.42 | 0.42 | 3.14 | 0.03 | 0.08 | 0.00 |
| Experimental Example 2-36 | 12.22 | 0.00 | 0.67 | 0.85 | 0.00 | 1.53 | 74.64 | 0.00 | 4.85 | 1.48 | 0.43 | 3.21 | 0.04 | 0.09 | 0.00 |
| Experimental Example 2-37 | 12.61 | 0.00 | 1.52 | 0.00 | 0.00 | 1.15 | 74.74 | 0.00 | 4.87 | 1.43 | 0.46 | 3.10 | 0.03 | 0.09 | 0.00 |
| Experimental Example 2-38 | 12.30 | 0.00 | 1.53 | 0.00 | 0.00 | 1.54 | 74.49 | 0.00 | 4.87 | 1.48 | 0.47 | 3.17 | 0.04 | 0.10 | 0.00 |
| Experimental Example 2-39 | 12.71 | 0.00 | 0.00 | 1.54 | 0.00 | 1.15 | 74.64 | 0.00 | 4.82 | 1.46 | 0.43 | 3.09 | 0.03 | 0.00 | 0.13 |
| Experimental Example 2-40 | 13.88 | 0.00 | 0.00 | 0.00 | 0.00 | 1.53 | 74.50 | 0.00 | 4.85 | 1.49 | 0.47 | 3.16 | 0.03 | 0.00 | 0.09 |
| Experimental Example 2-41 | 12.28 | 0.00 | 0.00 | 1.53 | 0.00 | 1.54 | 74.58 | 0.00 | 4.87 | 1.46 | 0.40 | 3.23 | 0.03 | 0.00 | 0.06 |
| Experimental Example 2-42 | 12.78 | 0.00 | 0.77 | 0.77 | 0.00 | 1.16 | 74.51 | 0.00 | 4.82 | 1.40 | 0.44 | 3.23 | 0.03 | 0.00 | 0.09 |
| Experimental Example 2-43 | 12.54 | 0.00 | 0.81 | 0.75 | 0.00 | 1.56 | 74.44 | 0.00 | 4.81 | 1.47 | 0.43 | 3.05 | 0.03 | 0.00 | 0.11 |
| Experimental Example 2-44 | 12.78 | 0.00 | 1.55 | 0.00 | 0,00 | 1.17 | 74.46 | 0.00 | 4.83 | 1.48 | 0.46 | 3.17 | 0.03 | 0.00 | 0.07 |
| Experimental Example 2-45 | 12.42 | 0.00 | 1.55 | 0.00 | 0.00 | 1.55 | 74.32 | 0.00 | 4.87 | 1.53 | 0.47 | 3.14 | 0.03 | 0.00 | 0.12 |
| Experimental Example 2-46 | 14.11 | 0.00 | 0.00 | 0.00 | 0.00 | 1.56 | 68.76 | 5.57 | 4.83 | 1.48 | 0.44 | 3.16 | 0.03 | 0.06 | 0.00 |
| Experimental Example 2-47 | 14.00 | 0.00 | 0.00 | 0.00 | 0.00 | 1.55 | 67.10 | 7.46 | 4.83 | 1.51 | 0.44 | 3.04 | 0.03 | 0.06 | 0.00 |
| Experimental Example 2-48 | 6.26 | 0.00 | 7.06 | 0.77 | 0.78 | 0.79 | 74.07 | 0.55 | 4.61 | 1.47 | 0.43 | 3.07 | 0.03 | 0.00 | 0.09 |
| Experimental Example 2-49 | 6.26 | 0.00 | 7.06 | 1.56 | 0.00 | 0.79 | 74.02 | 0.55 | 4.62 | 1.46 | 0.44 | 3.11 | 0.03 | 0.00 | 0.10 |
| Experimental Example 2-50 | 6.26 | 0.00 | 7.06 | 0.00 | 1.56 | 0.79 | 74.08 | 0.55 | 4.54 | 1.47 | 0.41 | 3.14 | 0.03 | 0.00 | 0.10 |
| Experimental Example 2-51 | 0.00 | 7.82 | 7.06 | 0.00 | 0,00 | 0.79 | 74.03 | 0.55 | 4.62 | 1.46 | 0.47 | 3.06 | 0.03 | 0.00 | 0.10 |
| Experimental Example 2-52 | 12.54 | 0.00 | 0.00 | 0.78 | 0.78 | 1.57 | 74.09 | 0.54 | 4.62 | 1.38 | 0.45 | 3.11 | 0.03 | 0.00 | 0.09 |
| Experimental Example 2-53 | 12.55 | 0.00 | 0.00 | 1.57 | 0.00 | 1.57 | 74.15 | 0.55 | 4.55 | 1.38 | 0.41 | 3.15 | 0.04 | 0.00 | 0.10 |
| Experimental Example 2-54 | 12.54 | 0.00 | 0.00 | 0.00 | 1.57 | 1.57 | 74.08 | 0.54 | 4.55 | 1.36 | 0.43 | 3.22 | 0.04 | 0.00 | 0.10 |
| Experimental Example 2-55 | 0.00 | 14.10 | 0.00 | 0.00 | 0.00 | 1.57 | 74.05 | 0.54 | 4.62 | 1.36 | 0.43 | 3.21 | 0.03 | 0.00 | 0.09 |

TABLE 6

| | | R | | | | | Sintered magnet (R$_x$T$_b$B$_b$M$_c$C$_e$) | | | Sintering temperature (° C.) | R-T-B-based magnet | | | | | | R-OCN phase | | R-T-B-C phase | | CV value C | |
|---|---|---|---|---|---|---|---|---|---|---|---|---|---|---|---|---|---|---|---|---|---|---|
| | | R1 | | R2 | | | | | | | Area ratio of void (%) | Main phase R$_2$T$_{14}$B Main phase crystal grain size | | | | Maximum area (μm$^2$) | Area ratio (%) | Presence or absence | Maximum area (μm$^2$) | | |
| | | Kind of element | 1-x-y | Kind of element | x | y | d/b | e/b | | | | D50 (μm) | M$_{RC}$/T$_{RC}$ | C$_{RC}$/T$_{RC}$ | | | | | | | |
| Experimental | Example 2-1 | Nd | 0.897 | Y | 0.103 | 0.000 | 0.026 | 0.043 | 875 | 0 | 0.42 | 0.27 | 0.77 | 42.7 | 29 | Present | 15.2 | 0.55 | Example |
| Experimental | Example 2-2 | Nd | 0.699 | Y | 0.301 | 0.000 | 0.027 | 0.042 | 890 | 0 | 0.43 | 0.28 | 0.79 | 43.5 | 27 | Present | 14.5 | 0.57 | Example |
| Experimental | Example 2-3 | Nd | 0.501 | Y | 0.499 | 0.000 | 0.025 | 0.042 | 900 | 0 | 0.42 | 0.28 | 0.69 | 44.2 | 27 | Present | 14.2 | 0.53 | Example |
| Experimental | Example 2-4 | Nd | 0.301 | Y | 0.699 | 0.000 | 0.025 | 0.043 | 910 | 0 | 0.45 | 0.25 | 0.77 | 44.8 | 23 | Present | 13.8 | 0.56 | Example |
| Experimental | Example 2-5 | Nd | 0.099 | Y | 0.901 | 0.000 | 0.026 | 0.042 | 925 | 0 | 0.49 | 0.23 | 0.76 | 45.4 | 22 | Present | 13 | 0.57 | Example |
| Experimental | Example 2-6 | Nd | 0.898 | Ce | 0.102 | 0.000 | 0.025 | 0.043 | 845 | 0 | 0.40 | 0.23 | 0.69 | 42.6 | 28 | Present | 15.2 | 0.57 | Example |
| Experimental | Example 2-7 | Nd | 0.699 | Ce | 0.301 | 0.000 | 0.025 | 0.042 | 870 | 0 | 0.42 | 0.24 | 0.77 | 43.6 | 26 | Present | 14.4 | 0.53 | Example |
| Experimental | Example 2-8 | Nd | 0.500 | Ce | 0.500 | 0.000 | 0.027 | 0.042 | 870 | 0 | 0.42 | 0.27 | 0.76 | 44.1 | 27 | Present | 14.3 | 0.53 | Example |
| Experimental | Example 2-9 | Nd | 0.300 | Ce | 0.700 | 0.000 | 0.026 | 0.042 | 870 | 0 | 0.43 | 0.26 | 0.70 | 44.8 | 24 | Present | 13.9 | 0.55 | Example |
| Experimental | Example 2-10 | Nd | 0.099 | Ce | 0.901 | 0.000 | 0.025 | 0.041 | 870 | 0 | 0.45 | 0.29 | 0.77 | 45.3 | 22 | Present | 13.1 | 0.57 | Example |
| Experimental | Example 2-11 | Nd | 0.950 | — | 0.000 | 0.050 | 0.025 | 0.041 | 345 | 0 | 0.40 | 0.27 | 0.78 | 42.1 | 30 | Present | 16.2 | 0.57 | Example |
| Experimental | Example 2-12 | Nd | 0.850 | Ce | 0.100 | 0.050 | 0.025 | 0.042 | 845 | 0 | 0.40 | 0.25 | 0.71 | 42.8 | 28 | Present | 15.4 | 0.53 | Example |
| Experimental | Example 2-13 | Nd | 0.751 | Ce | 0.199 | 0.050 | 0.026 | 0.043 | 845 | 0 | 0.41 | 0.26 | 0.72 | 43 | 27 | Present | 14.8 | 0.55 | Example |
| Experimental | Example 2-14 | Nd | 0.650 | Ce | 0.300 | 0.050 | 0.025 | 0.042 | 845 | 0 | 0.41 | 0.29 | 0.69 | 43.4 | 27 | Present | 14.7 | 0.56 | Example |
| Experimental | Example 2-15 | Nd | 0.450 | Ce | 0.500 | 0.050 | 0.026 | 0.042 | 870 | 0 | 0.42 | 0.25 | 0.78 | 44 | 25 | Present | 14.3 | 0.54 | Example |
| Experimental | Example 2-16 | Nd | 0.251 | Ce | 0.699 | 0.050 | 0.026 | 0.043 | 870 | 0 | 0.43 | 0.29 | 0.76 | 44.4 | 25 | Present | 13.9 | 0.55 | Example |
| Experimental | Example 2-17 | Nd | 0.147 | Ce | 0.803 | 0.050 | 0.025 | 0.041 | 870 | 0 | 0.44 | 0.25 | 0.79 | 44.6 | 24 | Present | 13.3 | 0.57 | Example |
| Experimental | Example 2-18 | Nd | 0.925 | — | 0.000 | 0.075 | 0.026 | 0.041 | 820 | 0 | 0.40 | 0.28 | 0.69 | 41.8 | 28 | Present | 15.7 | 0.54 | Example |
| Experimental | Example 2-19 | Nd | 0.825 | Ce | 0.100 | 0.075 | 0.025 | 0.041 | 845 | 0 | 0.40 | 0.24 | 0.79 | 41.9 | 27 | Present | 15.7 | 0.56 | Example |
| Experimental | Example 2-20 | Nd | 0.900 | — | 0.000 | 0.100 | 0.026 | 0.042 | 820 | 0 | 0.40 | 0.28 | 0.73 | 41.2 | 29 | Present | 16 | 0.53 | Example |
| Experimental | Example 2-21 | Nd | 0.800 | Ce | 0.100 | 0.100 | 0.027 | 0.043 | 820 | 0 | 0.40 | 1.27 | 0.73 | 42.3 | 27 | Present | 15.2 | 0.54 | Example |
| Experimental | Example 2-22 | Nd | 0.701 | Ce | 0.199 | 0.100 | 0.025 | 0.043 | 845 | 0 | 0.40 | 0.25 | 0.73 | 42.8 | 26 | Present | 14.9 | 0.57 | Example |
| Experimental | Example 2-23 | Nd | 0.600 | Ce | 0.300 | 0.100 | 0.026 | 0.042 | 845 | 0 | 0.41 | 0.24 | 0.74 | 43.3 | 26 | Present | 14.4 | 0.54 | Example |
| Experimental | Example 2-24 | Nd | 0.399 | Ce | 0.501 | 0.100 | 0.027 | 0.043 | 870 | 0 | 0.42 | 0.29 | 0.74 | 43.8 | 26 | Present | 14.1 | 0.53 | Example |
| Experimental | Example 2-25 | Nd | 0.202 | Ce | 0.698 | 0.100 | 0.027 | 0.043 | 870 | 0 | 0.43 | 0.29 | 0.79 | 44.1 | 24 | Present | 14 | 0.55 | Example |
| Experimental | Example 2-26 | Nd | 0.099 | Ce | 0.798 | 0.102 | 0.025 | 0.041 | 870 | 0 | 0.44 | 0.29 | 0.71 | 45.2 | 23 | Present | 13.4 | 0.54 | Example |
| Experimental | Example 2-27 | Nd | 0.875 | — | 0.000 | 0.125 | 0.025 | 0.042 | 820 | 0 | 0.40 | 0.25 | 0.70 | 41.1 | 30 | Present | 16.3 | 0.56 | Example |

TABLE 7

| | | R | | | Sintered magnet | | | | | | Sintering temp-erature (°C.) | R-T-B-based magnet | | | | | | | | |
|---|---|---|---|---|---|---|---|---|---|---|---|---|---|---|---|---|---|---|---|---|
| | | R1 | | R2 | | Sm | | | | | | Area ratio of void (%) | Main phase R₂T₁₄B | | | | | R-OCN phase | R-T-B-C phase | | |
| | | Kind of element | 1-x-y | Kind of element | x | y | d/b | e/b | | | | | Main phase crystal grain size D50 (μm) | $M_{RC}/T_{RC}$ | $C_{RC}/T_{RC}$ | Maximum area (μm²) | Area ratio (%) | Presence or absence | Maximum area (μm²) | CV value C | |
| Experimental | Example 2-28 | Nd | 0.775 | Ce | 0.100 | 0.125 | 0.025 | 0.043 | | | 820 | 0 | 0.40 | 0.26 | 0.75 | 42.5 | 29 | Present | 15.3 | 0.55 | Example |
| Experimental | Example 2-29 | Nd | 0.850 | — | 0.000 | 0.150 | 0.026 | 0.043 | | | 820 | 0 | 0.40 | 0.27 | 0.70 | 41.8 | 29 | Present | 15.7 | 0.57 | Example |
| Experimental | Example 2-30 | Nd | 0.748 | Ce | 0.102 | 0.150 | 0.025 | 0.043 | | | 820 | 0 | 0.40 | 0.23 | 0.70 | 42 | 28 | Present | 15.2 | 0.55 | Example |
| Experimental | Example 2-31 | Nd | 0.548 | Ce | 0.302 | 0.150 | 0.025 | 0.041 | | | 845 | 0 | 0.41 | 0.25 | 0.76 | 43.8 | 25 | Present | 14.3 | 0.57 | Example |
| Experimental | Example 2-32 | Nd | 0.351 | Ce | 0.499 | 0.150 | 0.025 | 0.043 | | | 870 | 0 | 0.42 | 0.24 | 0.73 | 44.2 | 24 | Present | 14 | 0.54 | Example |
| Experimental | Example 2-33 | Nd | 0.150 | Ce | 0.700 | 0.150 | 0.027 | 0.043 | | | 870 | 0 | 0.43 | 0.24 | 0.72 | 44.8 | 23 | Present | 13.7 | 0.54 | Example |
| Experimental | Example 2-34 | Nd | 0.800 | — | 0.000 | 0.200 | 0.027 | 0.041 | | | 820 | 0 | 0.40 | 0.29 | 0.71 | 41.9 | 29 | Present | 15.8 | 0.56 | Example |
| Experimental | Example 2-35 | Nd | 0.826 | Y, Ce | 0.099 | 0.075 | 0.025 | 0.042 | | | 850 | 0 | 0.42 | 0.29 | 0.76 | 41.8 | 27 | Present | 15.6 | 0.55 | Example |
| Experimental | Example 2-36 | Nd | 0.800 | Y, Ce | 0.100 | 0.100 | 0.025 | 0.043 | | | 850 | 0 | 0.42 | 0.28 | 0.79 | 42.2 | 27 | Present | 15.1 | 0.53 | Example |
| Experimental | Example 2-37 | Nd | 0.825 | Y | 0.100 | 0.075 | 0.025 | 0.041 | | | 875 | 0 | 0.42 | 0.23 | 0.76 | 41.8 | 27 | Present | 15.8 | 0.55 | Example |
| Experimental | Example 2-38 | Nd | 0.800 | Y | 0.100 | 0.100 | 0.026 | 0.043 | | | 875 | 0 | 0.42 | 0.27 | 0.78 | 42.4 | 28 | Present | 15.1 | 0.53 | Example |
| Experimental | Example 2-39 | Nd | 0.825 | Ce | 0.100 | 0.075 | 0.025 | 0.041 | | | 845 | 0 | 0.43 | 0.29 | 0.70 | 41.8 | 27 | Present | 15.8 | 0.55 | Example |
| Experimental | Example 2-40 | Nd | 0.901 | — | 0.000 | 0.099 | 0.025 | 0.042 | | | 820 | 0 | 0.42 | 0.26 | 0.79 | 41.1 | 29 | Present | 16.2 | 0.52 | Example |
| Experimental | Example 2-41 | Nd | 0.800 | Ce | 0.100 | 0.100 | 0.025 | 0.043 | | | 820 | 0 | 0.44 | 0.28 | 0.71 | 42.1 | 27 | Present | 15.3 | 0.53 | Example |
| Experimental | Example 2-42 | Nd | 0.825 | Y, Ce | 0.100 | 0.075 | 0.025 | 0.043 | | | 850 | 0 | 0.44 | 0.24 | 0.70 | 42.4 | 29 | Present | 15.4 | 0.54 | Example |
| Experimental | Example 2-43 | Nd | 0.801 | Y, Ce | 0.100 | 0.100 | 0.026 | 0.041 | | | 850 | 0 | 0.43 | 0.23 | 0.73 | 42.2 | 27 | Present | 15.1 | 0.53 | Example |
| Experimental | Example 2-44 | Nd | 0.824 | Y | 0.100 | 0.075 | 0.026 | 0.043 | | | 875 | 0 | 0.43 | 0.25 | 0.78 | 41.8 | 27 | Present | 15.9 | 0.55 | Example |
| Experimental | Example 2-45 | Nd | 0.800 | Y | 0.100 | 0.100 | 0.027 | 0.042 | | | 875 | 0 | 0.44 | 0.26 | 0.70 | 42.4 | 27 | Present | 15.1 | 0.53 | Example |
| Experimental | Example 2-46 | Nd | 0.900 | — | 0.000 | 0.100 | 0.026 | 0.043 | | | 850 | 0 | 0.40 | 0.26 | 0.77 | 41.2 | 29 | Present | 16.1 | 0.54 | Example |
| Experimental | Example 2-47 | Nd | 0.900 | — | 0.000 | 0.100 | 0.026 | 0.041 | | | 850 | 0 | 0.40 | 0.24 | 0.79 | 41.1 | 39 | Present | 16.2 | 0.53 | Example |
| Experimental | Example 2-48 | Nd | 0.400 | Y, Ce, La | 0.550 | 0.050 | 0.025 | 0.041 | | | 925 | 0 | 0.43 | 0.23 | 0.77 | 44.1 | 25 | Present | 14.1 | 0.54 | Example |
| Experimental | Example 2-49 | Nd | 0.400 | Y, Ce | 0.550 | 0.050 | 0.025 | 0.042 | | | 925 | 0 | 0.42 | 0.25 | 0.79 | 44.3 | 25 | Present | 14.2 | 0.54 | Example |
| Experimental | Example 2-50 | Nd | 0.400 | Y, La | 0.550 | 0.050 | 0.026 | 0.042 | | | 925 | 0 | 0.40 | 0.28 | 0.74 | 44.2 | 25 | Present | 14.2 | 0.55 | Example |
| Experimental | Example 2-51 | Nd | 0.500 | Y | 0.450 | 0.050 | 0.026 | 0.041 | | | 925 | 0 | 0.42 | 0.24 | 0.73 | 43.9 | 26 | Present | 14.5 | 0.55 | Example |
| Experimental | Example 2-52 | Nd | 0.800 | Ce, La | 0.100 | 0.100 | 0.025 | 0.042 | | | 835 | 0 | 0.41 | 0.23 | 0.70 | 42.3 | 29 | Present | 15.2 | 0.54 | Example |
| Experimental | Example 2-53 | Nd | 0.800 | Ce | 0.100 | 0.100 | 0.024 | 0.042 | | | 835 | 0 | 0.44 | 0.28 | 0.79 | 42.3 | 27 | Present | 15.3 | 0.54 | Example |
| Experimental | Example 2-54 | Nd | 0.800 | La | 0.100 | 0.100 | 0.024 | 0.043 | | | 835 | 0 | 0.46 | 0.24 | 0.78 | 42.2 | 26 | Present | 15.2 | 0.54 | Example |
| Experimental | Example 2-55 | Pr | 0.800 | — | 0.100 | 0.100 | 0.024 | 0.043 | | | 835 | 0 | 0.44 | 0.24 | 0.69 | 41.3 | 29 | Present | 15.9 | 0.53 | Example |

TABLE 8

| | R-T-B-based magnet Magnetic characteristics | | | | | |
|---|---|---|---|---|---|---|
| | Magnetizing field Hmag (kA/m) | Coercivity HcJ$_{Hmag}$ (kA/m) | Temperature coefficient β of coercivity (%/° C.) | Remanence Br$_{Hmag}$ (T) | Minor curve flatness H$_{\_50\%Js}$/HcJ$_{Hmag}$ (%) | |
| Experimental Example 2-1 | 800 | 576 | −0.38 | 1.11 | 70 | Example |
| Experimental Example 2-2 | 480 | 312 | −0.40 | 1.08 | 73 | Example |
| Experimental Example 2-3 | 360 | 248 | −0.39 | 1.06 | 73 | Example |
| Experimental Example 2-4 | 240 | 128 | −0.41 | 1.02 | 71 | Example |
| Experimental Example 2-5 | 160 | 96 | −0.40 | 0.95 | 63 | Example |
| Experimental Example 2-6 | 640 | 528 | −0.39 | 1.16 | 80 | Example |
| Experimental Example 2-7 | 480 | 320 | −0.41 | 1.09 | 73 | Example |
| Experimental Example 2-8 | 440 | 288 | −0.40 | 1.07 | 72 | Example |
| Experimental Example 2-9 | 360 | 256 | −0.41 | 1.05 | 70 | Example |
| Experimental Example 2-10 | 240 | 168 | −0.40 | 0.94 | 67 | Example |
| Experimental Example 2-11 | 480 | 320 | −0.41 | 1.16 | 84 | Example |
| Experimental Example 2-12 | 440 | 304 | −0.40 | 1.14 | 82 | Example |
| Experimental Example 2-13 | 384 | 280 | −0.38 | 1.13 | 81 | Example |
| Experimental Example 2-14 | 344 | 224 | −0.39 | 1.07 | 79 | Example |
| Experimental Example 2-15 | 224 | 144 | −0.38 | 1.04 | 76 | Example |
| Experimental Example 2-16 | 200 | 104 | −0.39 | 1.02 | 74 | Example |
| Experimental Example 2-17 | 160 | 72 | −0.4 | 0.98 | 71 | Example |
| Experimental Example 2-18 | 360 | 240 | −0.38 | 1.14 | 84 | Example |
| Experimental Example 2-19 | 320 | 224 | −0.39 | 1.13 | 83 | Example |
| Experimental Example 2-20 | 280 | 208 | −0.38 | 1.13 | 85 | Example |
| Experimental Example 2-21 | 264 | 192 | −0.38 | 1.12 | 85 | Example |
| Experimental Example 2-22 | 240 | 168 | −0.39 | 1.10 | 84 | Example |
| Experimental Example 2-23 | 224 | 128 | −0.40 | 1.04 | 82 | Example |
| Experimental Example 2-24 | 184 | 96 | −0.41 | 1.03 | 79 | Example |
| Experimental Example 2-25 | 160 | 72 | −0.41 | 1.00 | 71 | Example |
| Experimental Example 2-26 | 144 | 40 | −0.41 | 0.96 | 69 | Example |
| Experimental Example 2-27 | 224 | 160 | −0.39 | 1.12 | 83 | Example |

TABLE 9

| | R-T-B-based magnet Magnetic characteristics | | | | | |
|---|---|---|---|---|---|---|
| | Magnetizing field Hmag (kA/m) | Coercivity HcJ$_{Hmag}$ (kA/m) | Temperature coefficient β of coercivity (%/° C.) | Remanence Br$_{Hmag}$ (T) | Minor curve flatness H$_{\_50\%Js}$/HcJ$_{Hmag}$ (%) | |
| Experimental Example 2-28 | 184 | 128 | −0.41 | 1.11 | 82 | Example |
| Experimental Example 2-29 | 184 | 96 | −0.41 | 1.11 | 77 | Example |
| Experimental Example 2-30 | 184 | 80 | −0.38 | 1.09 | 69 | Example |
| Experimental Example 2-31 | 160 | 56 | −0.41 | 1.03 | 69 | Example |
| Experimental Example 2-32 | 120 | 40 | −0.41 | 0.97 | 68 | Example |
| Experimental Example 2-33 | 104 | 24 | −0.38 | 0.91 | 63 | Example |
| Experimental Example 2-34 | 80 | 24 | −0.39 | 1.10 | 68 | Example |
| Experimental Example 2-35 | 344 | 232 | −0.39 | 1.14 | 82 | Example |
| Experimental Example 2-36 | 280 | 200 | −0.38 | 1.13 | 84 | Example |
| Experimental Example 2-37 | 360 | 240 | −0.39 | 1.15 | 82 | Example |
| Experimental Example 2-38 | 280 | 208 | −0.38 | 1.14 | 83 | Example |
| Experimental Example 2-39 | 320 | 208 | −0.38 | 1.12 | 82 | Example |
| Experimental Example 2-40 | 280 | 192 | −0.38 | 1.14 | 83 | Example |
| Experimental Example 2-41 | 264 | 192 | −0.38 | 1.13 | 84 | Example |
| Experimental Example 2-42 | 344 | 216 | −0.40 | 1.13 | 83 | Example |
| Experimental Example 2-43 | 280 | 184 | −0.38 | 1.12 | 83 | Example |
| Experimental Example 2-44 | 360 | 224 | −0.39 | 1.14 | 84 | Example |
| Experimental Example 2-45 | 280 | 208 | −0.38 | 1.12 | 84 | Example |
| Experimental Example 2-46 | 280 | 192 | −0.38 | 1.15 | 83 | Example |
| Experimental Example 2-47 | 280 | 184 | −0.39 | 1.16 | 82 | Example |
| Experimental Example 2-48 | 320 | 232 | −0.39 | 1.07 | 72 | Example |
| Experimental Example 2-49 | 320 | 256 | −0.38 | 1.08 | 72 | Example |

TABLE 9-continued

| | R-T-B-based magnet Magnetic characteristics | | | | | |
|---|---|---|---|---|---|---|
| | Magnetizing field Hmag (kA/m) | Coercivity HcJ$_{Hmag}$ (kA/m) | Temperature coefficient β of coercivity (%/° C.) | Remanence Br$_{Hmag}$ (T) | Minor curve flatness H$_{\_50\%Js}$/HcJ$_{Hmag}$ (%) | |
| Experimental Example 2-50 | 320 | 224 | −0.38 | 1.07 | 71 | Example |
| Experimental Example 2-51 | 320 | 192 | −0.38 | 1.02 | 73 | Example |
| Experimental Example 2-52 | 264 | 208 | −0.38 | 1.14 | 83 | Example |
| Experimental Example 2-53 | 264 | 192 | −0.38 | 1.15 | 84 | Example |
| Experimental Example 2-54 | 264 | 216 | −0.38 | 1.15 | 86 | Example |
| Experimental Example 2-55 | 264 | 168 | −0.38 | 1.11 | 81 | Example |

From Tables 6 to 9, it could be confirmed that the coercivity can be reduced while satisfying characteristics required for the variable magnetic flux magnet by substituting a part of Nd with Y or Ce.

INDUSTRIAL APPLICABILITY

Since the R-T-B-based magnet of the invention satisfies characteristics required for the variable magnetic flux magnet, the R-T-B-based magnet is suitable for the variable magnetic flux magnet.

EXPLANATIONS OF LETTERS OR NUMERALS

1 R-T-B-BASED MAGNET
2 MAIN PHASE CRYSTAL GRAIN
4 GRAIN BOUNDARY PHASE
4a TWO-GRAIN GRAIN BOUNDARY
4b TRIPLE JUNCTION

The invention claimed is:

1. An R-T-B-based magnet comprising
one or more of rare earth elements;
one or more of transition metal elements, including iron, or two or more of transition metal elements, including iron and cobalt;
boron;
an element M that is gallium, or gallium and aluminum; and carbon,
wherein a content ratio of the rare earth elements is set as "a", a content ratio of the transition metal elements is set as "b", a content ratio of boron is set as "c", a content ratio of the element M is set as "d", and a content ratio of carbon is set as "e" when the sum of elements contained in the R-T-B-based magnet is set to 100 at %, a, b, c, d, and e satisfy the following relationship, 14 at %≤a≤20 at %, 70 at %≤b≤82 at %, 4 at %≤c≤7 at %, 0.010≤d/b≤0.035, and 0.025≤e/b≤0.055, the R-T-B-based magnet includes main phase crystal grains composed of a compound having an $R_2T_{14}B$-type tetragonal structure, and a grain boundary phase existing between the main phase crystal grains,
the grain boundary phase includes an R-T-M-C phase containing one or more of the rare earth elements, one or more of the transition metal elements or two or more of the transition metal elements, the element M, and carbon,
the R-T-M-C phase satisfies relationships of $R_{RC}>R_{MP}$, $T_{RC}<T_{MP}$, $M_{RC}>M_{MP}$, and $C_{RC}>C_{MP}$, and $R_{RC}$ and $M_{RC}$ satisfy a relationship of $0.07≤M_{RC}/R_{RC}≤0.65$, when content ratios of the rare earth elements, the transition metal elements, the element M, and carbon contained in the main phase crystal grains are respectively set as $R_{MP}$, $T_{MP}$, $M_{MP}$, and $C_{MP}$, and content ratios of the rare earth elements, the transition metal elements, the element M, and carbon contained in the R-T-M-C phase are respectively set as $R_{RC}$, $T_{RC}$, $M_{RC}$, and $C_{RC}$.

2. The R-T-B-based magnet according to claim 1, wherein an average crystal grain size D50 of the main phase crystal grains is 2.50 μm or less.

3. The R-T-B-based magnet according to claim 1, wherein the grain boundary phase includes an R-O-C-N phase in which content ratios of the rare earth elements, oxygen, carbon, and nitrogen are higher than content ratios of the rare earth elements, oxygen, carbon, and nitrogen contained in the main phase crystal grains, an area ratio of the R-O-C-N phase is 10% or more, when an area of the grain boundary phase is set as 100%, and a maximum area of a phase in which the content ratio of the rare earth elements is higher than the content ratio of the rare earth elements contained in the main phase crystal grains is 70 μm$^2$ or less in the grain boundary phase.

4. The R-T-B-based magnet according to claim 2, wherein the grain boundary phase includes an R-O-C-N phase in which content ratios of the rare earth elements, oxygen, carbon, and nitrogen are higher than content ratios of the rare earth elements, oxygen, carbon, and nitrogen contained in the main phase crystal grains, an area ratio of the R-O-C-N phase is 10% or more, when an area of the grain boundary phase is set as 100%, and a maximum area of a phase in which the content ratio of the rare earth elements is higher than the content ratio of the rare earth elements contained in the main phase crystal grains is 70 m$^2$ or less in the grain boundary phase.

5. The R-T-B-based magnet according to claim 1, wherein a CV value of a concentration distribution of carbon is 0.85 or less in the R-T-B-based magnet.

6. The R-T-B-based magnet according to claim 1, wherein the rare earth elements include Nd, and one or more kinds selected from the group consisting of Y, Ce, and Sm.

7. The R-T-B-based magnet according to claim 1,
wherein the rare earth elements are composed of R1, R2, and Sm,
R1 is one or more of rare earth elements and includes Nd and does not include Y, Ce, and Sm, R2 is one or more of elements selected from Y and Ce, and,
in an (x, y) plane, x and y are on straight lines constituting a pentagon having a point A (0.000, 0.050), a point B (0.000, 0.150), a point C (0.700, 0.100), a point D (0.700, 0.000), and a point E (0.300, 0.000) as a vertex, or in a region surrounded by the pentagon, when a total number of atoms of the rare earth elements contained in the R-T-B-based magnet is set as 1, a ratio of the number of atoms of R2 to the total number of atoms of the rare earth elements is set as "x", and a ratio of the number of atoms of Sm to the total number of atoms of the rare earth elements is set as "y".

8. A motor comprising
the R-T-B-based magnet according to claim 1.

9. A generator comprising
the R-T-B-based magnet according to claim 1.

* * * * *